(12) United States Patent
Nickel et al.

(10) Patent No.: US 7,369,078 B2
(45) Date of Patent: May 6, 2008

(54) FLEXIBLE CONVERTER INTERFACE FOR USE IN ANALOG-TO-DIGITAL AND DIGITAL-TO-ANALOG SYSTEMS

(75) Inventors: Sean M. Nickel, Pittsburgh, PA (US); Rafael Castro, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 441 days.

(21) Appl. No.: 11/018,280

(22) Filed: Dec. 21, 2004

(65) Prior Publication Data

US 2005/0083222 A1    Apr. 21, 2005

Related U.S. Application Data

(60) Provisional application No. 60/601,878, filed on Aug. 16, 2004.

(51) Int. Cl.
*H03M 1/12* (2006.01)

(52) U.S. Cl. .................. 341/155; 341/100; 341/101; 341/144

(58) Field of Classification Search .............. 341/126
See application file for complete search history.

(56) References Cited

U.S. PATENT DOCUMENTS

| | | | |
|---|---|---|---|
| 5,764,546 A | 6/1998 | Bryant et al. | |
| 5,808,571 A * | 9/1998 | Kuwata et al. | 341/100 |
| 5,847,667 A | 12/1998 | Baek | |
| 5,898,761 A * | 4/1999 | McHale et al. | 379/93.01 |
| 6,067,584 A | 5/2000 | Hayles et al. | |
| 6,096,094 A | 8/2000 | Kay et al. | |
| 6,128,681 A * | 10/2000 | Shephard | 710/71 |
| 6,166,673 A | 12/2000 | Odom | |
| 6,243,738 B1 | 6/2001 | Hayles et al. | |
| 6,255,972 B1 * | 7/2001 | Gross et al. | 341/126 |
| 6,380,874 B1 | 4/2002 | Knudsen | |
| 6,510,487 B1 * | 1/2003 | Raza et al. | 711/100 |
| 6,587,942 B1 * | 7/2003 | Chiang | 713/100 |
| 6,700,807 B1 | 3/2004 | Williams et al. | |
| 6,728,814 B2 * | 4/2004 | Leinen | 710/305 |
| 6,792,494 B2 * | 9/2004 | Bennett et al. | 710/302 |
| 6,823,283 B2 | 11/2004 | Steger et al. | |
| 6,823,416 B1 * | 11/2004 | Dempsey et al. | 710/305 |
| 6,985,100 B2 * | 1/2006 | Geraghty et al. | 341/141 |

(Continued)

*Primary Examiner*—Khai M. Nguyen
(74) *Attorney, Agent, or Firm*—Meyertons Hood Kivlin Kowert & Goetzel, P.C.; Jeffrey C. Hood

(57) ABSTRACT

A flexible converter interface for interfacing with ADCs or DACs. The flexible converter interface may be comprised in a data acquisition device and may be a programmable ADC interface or a programmable DAC interface. The flexible converter interface may be programmed with a converter type parameter, a converter resolution parameter, and a converter data type parameter, among others, to interface with various types of ADCs or DACs and to allow for future expandability. The flexible converter interface may function as either a programmable parallel converter interface or a programmable serial converter interface depending upon the programmed converter type parameter. Additionally, functions associated with I/O pins corresponding to the flexible converter interface may vary depending upon the programmed converter resolution parameter and the programmed converter type parameter. Furthermore, the flexible converter interface may perform a data conversion operation on ADC or DAC data depending upon the programmed converter data type parameter.

55 Claims, 7 Drawing Sheets

U.S. PATENT DOCUMENTS

| | | |
|---|---|---|
| 7,015,838 B1 * | 3/2006 | Groen et al. ................. 341/100 |
| 2002/0118475 A1 * | 8/2002 | Ng et al. ....................... 360/46 |
| 2003/0038842 A1 | 2/2003 | Peck et al. |
| 2003/0040881 A1 | 2/2003 | Steger et al. |
| 2003/0074489 A1 | 4/2003 | Steger et al. |
| 2003/0163298 A1 | 8/2003 | Odom et al. |

* cited by examiner

FLEXIBLE CONVERTER INTERFACE FOR USE IN ANALOG-TO-DIGITAL AND DIGITAL-TO-ANALOG SYSTEMS

PRIORITY CLAIM

This application claims benefit of priority of U.S. provisional application Ser. No. 60/601,878 titled "Flexible Converter Interface for Data Acquisition Devices", filed Aug. 16, 2004, and whose inventors are Sean M. Nickel and Rafael Castro.

BACKGROUND OF THE INVENTION

1. Field of the Invention

This invention relates generally to measurement and data acquisition systems and, more particularly, to a flexible converter interface for use in analog-to-digital and digital-to-analog systems.

2. Description of the Related Art

Scientists and engineers often use measurement systems to perform a variety of functions, including measurement of a physical phenomena or unit under test (UUT), test and analysis of physical phenomena, process monitoring and control, control of mechanical or electrical machinery, data logging, laboratory research, and analytical chemistry, to name a few examples.

A typical measurement system comprises a computer system with a measurement device or measurement hardware. The measurement device may be a computer-based instrument, a data acquisition device or board, a programmable logic device (PLD), an actuator, or other type of device for acquiring or generating data. The measurement device may be a card or board plugged into one of the I/O slots of the computer system, or a card or board plugged into a chassis, or an external device. For example, in a common measurement system configuration, the measurement hardware is coupled to the computer system through a PCI bus, PXI (PCI extensions for Instrumentation) bus, a GPIB (General-Purpose Interface Bus), a VXI (VME extensions for Instrumentation) bus, a serial port, parallel port, or Ethernet port of the computer system. Optionally, the measurement system includes signal conditioning devices which receive field signals and condition the signals to be acquired.

A measurement system may typically include transducers, sensors, or other detecting means for providing "field" electrical signals representing a process, physical phenomena, equipment being monitored or measured, etc. The field signals are provided to the measurement hardware. In addition, a measurement system may also typically include actuators for generating output signals for stimulating a unit under test.

Measurement systems, which may also be generally referred to as data acquisition systems, may include the process of converting a physical phenomenon (such as temperature or pressure) into an electrical signal and measuring the signal in order to extract information. PC-based measurement and data acquisition (DAQ) systems and plug-in boards are used in a wide range of applications in the laboratory, in the field, and on the manufacturing plant floor, among others.

In a measurement or data acquisition process, analog signals may be received by a digitizer, which may reside in a DAQ device or instrumentation device. The analog signals may be received from a sensor, converted to digital data (possibly after being conditioned) by an analog-to-digital converter (ADC), and transmitted to a computer system for storage and/or analysis. When a measurement system generates an output analog signal, the computer system may generate digital signals that are provided to one or more digital-to-analog converters (DACs) in the DAQ device. The DACs may convert the digital signal to an output analog signal that is used, e.g., to stimulate a UUT.

A DAQ device typically includes custom circuitry to interface with specific ADCs and DACs. For example, a custom converter interface may be configured to interface with a serial ADC. In another example, a custom converter interface may be configured to interface with a parallel ADC. In general, an ADC may return data in a particular mode, either binary or two's complement. Depending on the type of data (i.e., unipolar or bipolar) being sampled by the ADC, data conversion may be necessary. The conversion from binary to two's complement and vice versa may be accomplished by inversion of the most significant bit (MSB).

Data conversion may be necessary in order to return data to software in the correct format. When sampling a unipolar signal, software typically interprets the data returned in straight binary mode. When sampling a bipolar signal, software usually interprets data in two's complement mode. The primary reason for software interpreting data in this manner is software efficiency and it is particularly important when the data storage type of the data is the same width as the resolution of the data from the converter. If the data returned is a unipolar value, all values will typically be positive. However, if two's complement representation of this data is used, one bit usually represents the sign and the remaining bits represent the data. For 16-bit unipolar data in a 16-bit integer format, one bit of resolution may need to be sacrificed in order to represent the sign. Since it is known that unipolar data is always positive, straight binary representation (which does not use a sign bit) is typically a more efficient way of interpreting the data. When bipolar data is returned, the sign bit is typically part of the data and therefore two's complement representation may be used without sacrificing any resolution.

In some custom ADC interfaces, programmable inversion of the MSB (to accomplish the data conversion) may be performed by tying the MSB of the data received from the ADC as well as a signal that specifies the type of data, i.e., unipolar or bipolar, to a logic unit that decides whether or not to invert the MSB. The output of this logic unit may be two signals: a MSB signal and a sign extension signal. Sign extension may be accomplished by tying the sign extension signal to all the upper bits of the data path. In the case of a 12-bit ADC with a 16-bit data path, the sign extension signal may be tied to lines 12 through 15 of the 16-bit data path. This setup is typically difficult to realize because the board designer may need to correctly identify and feed the MSB of the ADC into the logic, as well as tie the right lines of the FIFO to the sign extension signal and the MSB output signal. Also, this logic setup typically assumes that the ADC returns binary data. If the ADC returned two's complement data, an inverter may be placed on the MSB of the data coming into the logic unit. However, both binary and two's complement ADCs may not be supported on the same implementation without changing the design of the ADC interface. Also, in another implementation, to support a 24-bit ADC, the ADC interface may require twenty-four dedicated analog input (AI) FIFO pins. This may allow the designer to perform sign extension by tying all the upper bits to the sign extension signal; however, at least twenty-four dedicated pins may be required. I/O on logic chips is typically very expensive. Therefore, it may be necessary to keep the I/O pin count as low as possible to keep the price of the device low. In some cases, functionality may be reduced to reduce the pin count.

Data acquisition converter interfaces (e.g., ADC and DAC converter interfaces) have primarily been designed with custom interfaces. FIFO widths are typically chosen in accordance with the resolution of the converter. Sign extension for analog input usually requires custom schematic work. Interfaces to serial converters (e.g., serial ADC converters) are typically developed around the communications protocol for the corresponding device. However, custom circuitry typically means less leverage of design, longer design cycles for new products, more expensive product costs, and lower yields.

SUMMARY OF THE INVENTION

Various embodiments of a flexible converter interface for interfacing with analog-to-digital converters (ADCs) or digital-to-analog converters (DACs) are disclosed. In one embodiment, one or more flexible converters may be comprised in an IC (e.g., a timing and data control ASIC) of a data acquisition device. In this embodiment, a data acquisition system may comprise the data acquisition device coupled to a computer system (e.g., desktop PC) and a unit under test (UUT). It is noted in other embodiments one or more flexible converters may be included in various types of analog-to-digital and digital-to-analog systems or devices, e.g., any system or device typically including one or more converter interfaces, such as measurement and instrumentation devices, modems, and temperature monitoring devices, among others. The flexible converter interface may be a programmable ADC interface or a programmable DAC interface.

In one embodiment, the programmable ADC interface may be programmable to support both parallel and serial ADCs. The programmable ADC interface may be coupled to one or more ADCs to receive digital signals and may be programmable to perform data conversions and other operations on the received digital data to send the data to the computer system in a desired form. The programmable ADC interface may include a configuration unit, which may be programmed with an ADC type parameter, an ADC resolution parameter, and an ADC data type parameter, among others, to interface with various types of ADCs and to allow for future expandability. The programmed state of each of the parameters may depend on the characteristics of the one or more ADCs that are connected to the programmable ADC interface. For example, an ADC may be a parallel or a serial ADC, may have a resolution of between 12 and 24 bits, and may output data in either straight binary or two's complement form.

In one embodiment, the programmable ADC interface may function as either a programmable parallel ADC interface or a programmable serial ADC interface depending upon the programmed ADC type parameter. Also, functions associated with a portion of the I/O pins associated with the programmable ADC interface may vary depending upon the programmed ADC resolution and the programmed ADC type parameter. For example, if the ADC type parameter indicates a parallel mode of operation and the programmed ADC resolution is less than a maximum value, a portion of the I/O pins may be configured as ADC data input pins and a remaining portion of the I/O pins may be configured to perform other functions. Additionally, the configuration of an analog input buffer may be dependent upon the programmed ADC resolution. For example, a depth and a width of the analog input buffer may be dependent upon the programmed ADC resolution.

In one embodiment, the programmable ADC interface may receive a data type signal. The data type signal may indicate whether the data acquisition device received a unipolar analog signal or a bipolar analog signal. The programmed ADC data type parameter may indicate whether the corresponding one or more ADCs will send ADC data to the programmable ADC interface in straight binary or two's complement form. The computer system may need to receive data from the data acquisition device in a particular form. Therefore, the programmable ADC interface may comprise a data conversion and extension unit, which may perform a data conversion operation on the received ADC data depending upon the programmed ADC data type parameter and the received data type signal. Also, the data conversion and extension unit may perform an extension operation on the received ADC data depending upon the programmed ADC resolution.

In one embodiment, the programmable DAC interface may be programmable to support both parallel and serial DACs. The programmable DAC interface may be coupled to one or more DACs and may be programmable to perform data conversions and other operations on digital data received from the computer system to send the data to the DACs in a particular format. The programmable DAC interface may include a configuration unit, which may be programmed with a DAC type parameter, a DAC resolution parameter, and a DAC data type parameter, among others, to interface with various types of DACs and to allow for future expandability. The programmed state of each of the parameters may depend on the characteristics of the one or more DACs that are connected to the programmable DAC interface. For example, a DAC may be a parallel or a serial DAC, may have a resolution of between 12 and 24 bits, and may be configured to receive digital data in either straight binary or two's complement form.

In one embodiment, the programmable DAC interface may function as either a programmable parallel DAC interface or a programmable serial DAC interface depending upon the programmed DAC type parameter. Also, functions associated with a portion of the I/O pins associated with the programmable DAC interface may vary depending upon the programmed DAC resolution and the programmed DAC type parameter. For example, if the programmed DAC type parameter indicates a parallel mode of operation and the programmed DAC resolution is less than a maximum value, a portion of the I/O pins may be configured as DAC data output pins and a remaining portion of the I/O pins may be configured to perform other functions. Additionally, the configuration of an analog output buffer may be dependent upon the programmed DAC resolution. For example, a depth and a width of the analog output buffer may be dependent upon the programmed DAC resolution.

In one embodiment, the programmed DAC data type parameter may indicate whether one or more DACs coupled to the programmable DAC interface are configured to receive DAC data in straight binary or two's complement form. Therefore, the programmable DAC interface may comprise a data conversion unit, which may perform a data conversion operation on the DAC data to be transmitted to the one or more DACs depending upon the programmed DAC data type parameter.

In one embodiment, the data acquisition device may include logic external to the integrated circuit (e.g., a timing a data control ASIC). In this embodiment, the integrated circuit may operate in a bypass mode of operation when the logic external to the integrated circuit is configured to perform write operations to the one or more DACs. During the bypass mode of operation, the integrated circuit may transmit timing and control signals to the external logic to perform the write operations. In this embodiment, the integrated circuit may include an external shift in progress unit. During the bypass mode of operation, the external shift in progress unit may assert a hold off signal when a write operation to the one or more DACs is in progress to hold off new write operations. In one embodiment, the data acquisition device may also include an analog output buffer located external to the integrated circuit (e.g., a timing a data control ASIC). In this embodiment, the integrated circuit may transmit timing and control signals to the external analog output buffer to perform update and write operations to the one or more DACs.

Figure 1:
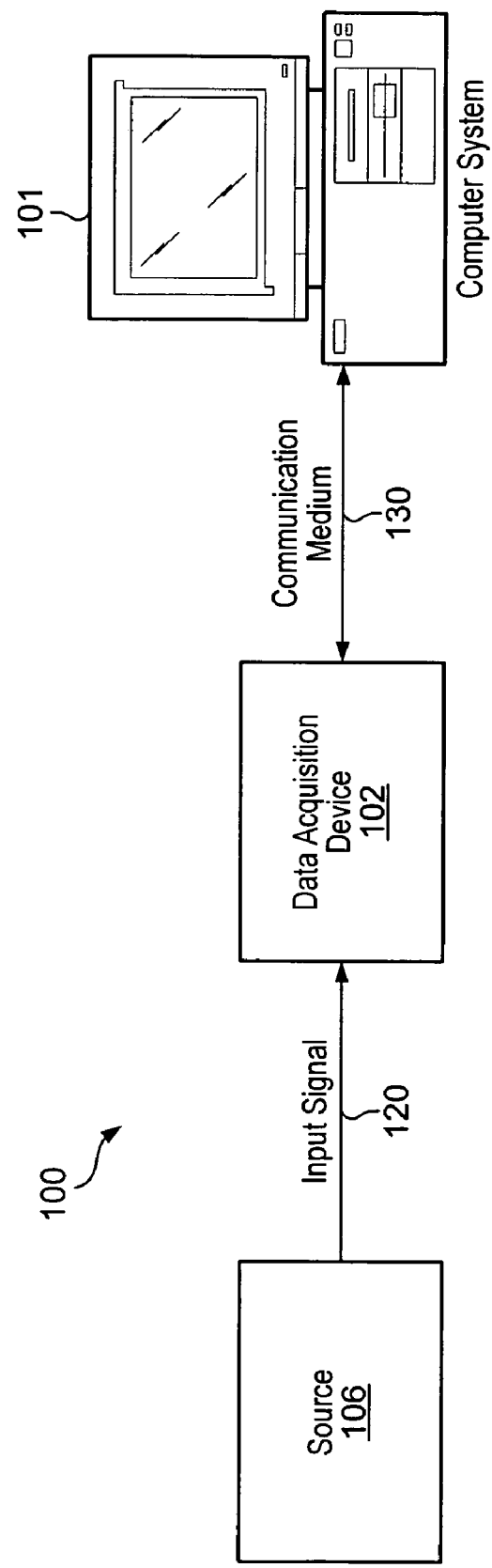
FIG. 1 is a diagram of one embodiment of a computer-based measurement system or data acquisition system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Data Acquisition System

FIG. 1 is a diagram of one embodiment of a computer-based measurement system or data acquisition system 100. The data acquisition system 100 may comprise a computer system 101, which may be coupled to a measurement device, referred to as data acquisition (DAQ) device 102, through a communication medium 130. The DAQ device 102 may be an internal card or board coupled to a bus, e.g., a Peripheral Component Interconnect (PCI), PCI Express, Industry Standard Architecture (ISA), or Extended Industry Standard Architecture (EISA) bus, but is shown external to the computer 101 for illustrative purposes. The measurement device or DAQ device 102 may also be an external device coupled to the computer system 101. In this embodiment, the communication medium 130 may be a serial bus, such as USB, IEEE 1394, MXI bus, Ethernet, or a proprietary bus, or a parallel bus such as GPIB or others. It is noted that the communication medium 130 may be a wired or wireless communication medium.

The DAQ device 102 may be coupled to an external source 106, such as an instrument, sensor, transducer, or actuator from which the DAQ device 102 may receive an input signal 120, e.g., an analog input such as sensor data. In one example, the external source 106 may be a temperature sensor, which is comprised in a unit under test (UUT). In this example, the DAQ device 102 may receive temperature reading from the temperature sensor and convert the analog data to digital form to be sent to the computer system 101 for analysis. Additionally, the DAQ device 102 may receive a digital input, e.g., a binary pattern, from the external source 106 (e.g., a UUT). Furthermore, the DAQ device 102 may also produce analog or digital signals, e.g., for stimulating the UUT.

The computer system 101 may be operable to control the DAQ device 102. For example, the computer system 101 may be operable to direct the DAQ device 102 to perform an acquisition, and may obtain data from the DAQ device 102 for storage and analysis therein. Additionally, the computer system 101 may be operable to send data to the device 102 for various purposes, such as for use in generating analog signals used for stimulating a UUT.

The computer system 101 may include a processor, which may be any of various types, including an x86 processor, e.g., a Pentium™ class, a PowerPC™ processor, a CPU from the SPARC™ family of RISC processors, as well as others. Also, the computer system 101 may also include one or more memory subsystems (e.g., Dynamic Random Access Memory (DRAM) devices). The memory subsystems may collectively form the main memory of computer system 101 from which programs primarily execute. The main memory may be operable to store a user application and a driver software program. The user application may be executable by the processor to conduct the data acquisition/generation process. The driver software program may be executable by the processor to receive data acquisition/generation tasks from the user application and program the DAQ device 102 accordingly.

Data Acquisition Device

Figure 2:
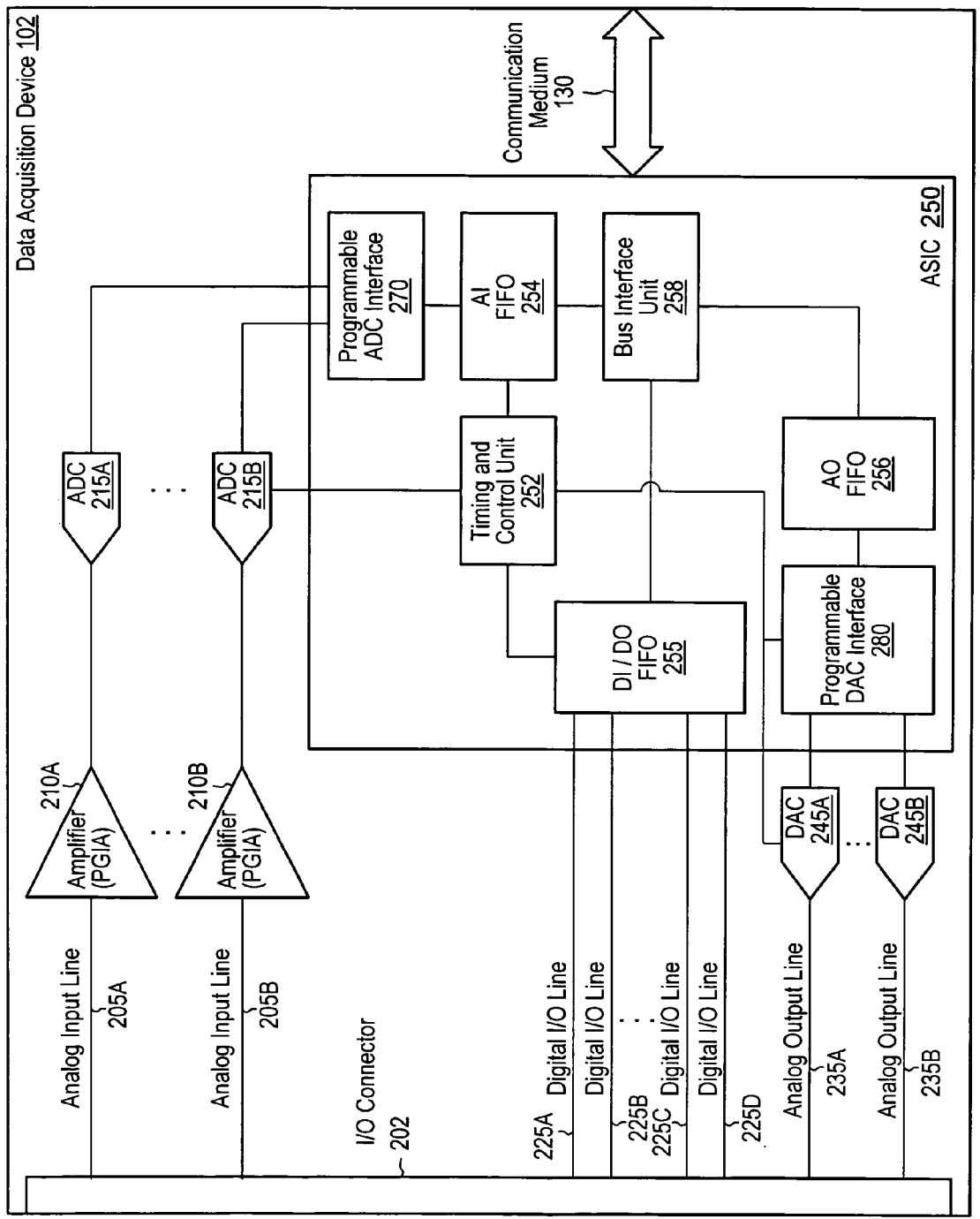
FIG. 2 is a block diagram of one embodiment of a data acquisition (DAQ) device.

FIG. 2 is a block diagram of one embodiment of a data acquisition (DAQ) device 102. Components that correspond to those shown in FIG. 1 are numbered identically for simplicity and clarity. As described above, the DAQ device 102 may be an internal device coupled to, e.g., a PCI bus, or may also be an external device coupled to the computer system 101 via a serial bus, e.g., MXI bus, or a parallel bus, e.g., a GPIB. The DAQ device 102 may be a board or a module comprising one or more integrated circuits (ICs) or the DAQ device 102 may be an IC, for example, a mixed-signal IC.

The DAQ device 102 may comprise an input/output (I/O) connector 202, analog input lines 205A and 205B, amplifiers 210A and 210B, analog-to-digital converters (ADCs) 215A and 215B, digital I/O lines 225A, 225B, 225C, and 225D, analog output lines 235A and 235B, a timing and data control IC (e.g., application-specific integrated circuit (ASIC) 250), digital-to-analog converters (DACs) 245A and 245B, and communication medium 130. It should be noted that the components described with reference to FIG. 2 are meant to be exemplary only, and are not intended to limit the invention to any specific set of components or configurations. For example, in various embodiments, one or more of the components described may be omitted, combined, modified, or additional components included, as desired. It is also noted that the DAQ device 102 may be comprised in any type of system, such as desktops, portable appliances, servers, communication products, workstations, and instrumentation chassis, among others.

The DAQ device 102 may receive and send digital and/or analog data via the input and output lines of the I/O connector 202. For example, the I/O connector 202 may be coupled to a signal source (e.g., source 106 of FIG.1) comprised in a UUT to receive analog signals. The I/O connector 202 may comprise analog input lines 205A and 205B, which may convey the received analog signals to amplifier 210A. It is noted however that in other embodiments the DAQ device 102 may comprise any number of analog input lines, e.g., four analog input lines.

In one embodiment, amplifiers 210A and 210B may be programmable gain instrumentation amplifiers (PGIAs). PGIAs are typically differential amplifiers having a high input impedance and a gain that is adjustable through the variation of a single resistor. The amplifier 210A may apply a specified amount of gain to the input signal to ensure proper analog-to-digital conversion. Also, PGIAs may convert differential input signals into single-ended outputs, which may be needed for the ADC (e.g., ADC 215A) to correctly digitize the data. It is noted however that in other embodiments amplifier 210A and/or amplifier 210B may be other types of amplifiers typically used in data acquisition devices. It is also noted that DAQ device 102 may comprise any number of amplifiers, e.g., a single amplifier or four amplifiers.

The output of amplifier 210A may be connected to ADC 215A, which may digitize the analog signals. ADCs are devices that convert a continuously varying (analog) signal into a discrete (digital) signal. The resolution of the ADC typically indicates the number of discrete values it can produce. For example, if the ADC has an eight-bit resolution, the ADC may be able to encode an analog input to one of 256 discrete values (since $2^8$=256). Each discrete value is derived by sampling the analog signal at a predetermined rate (i.e., the sampling rate of the ADC). More specifically, the signal values at particular time intervals are measured and stored. An ADC typically includes a sample and hold circuit, which holds the input value constant during the time the ADC performs the analog-to-digital conversion, since the ADC cannot make an instantaneous conversion. It is noted however that in other embodiments the DAQ device 102 may comprise any number of ADCs, for example, the DAQ device 102 may include a single ADC or four ADCs.

After the signals are digitized, the ADC 215A may send the digital signals to the ASIC 250. In one embodiment, the ASIC 250 may be a mixed-signal ASIC, which may be configured to perform the timing and data control functions for the DAQ device 102. The ASIC 250 may include a timing and control unit 252, a programmable ADC interface 270, an analog input (AI) first-in first-out (FIFO) buffer 254, a programmable DAC interface 280, a digital input (DI)/ digital output (DO) FIFO buffer 255, an analog output (AO) FIFO buffer 256, and a bus interface unit 258. It is noted that in other embodiments one or more of the components of ASIC 250 may be omitted, combined, modified, or additional components included, as desired. For example, in other embodiments, other types of AI and AO buffers may be used.

The ASIC 250 may receive the digitized signals from ADC 215A at the programmable ADC interface 270. The programmable ADC interface 270 may be a flexible converter interface that is programmable to support both parallel and serial ADCs. The ADC interface 270 may perform data conversions and other operations on digital data received from one or more ADCs to eventually send the data to the computer system (e.g., computer system 101 of FIG. 1) in a particular format. For example, the programmable ADC interface 270 may be programmed to convert the received digital data, e.g., from straight binary to two's complement form. As described below with reference to FIG. 3, the programmable ADC interface 270 may be programmed with other parameters to interface with various types of parallel and serial ADCs and to allow for future expandability.

The programmable ADC interface 270 may send the received data to be stored in AI FIFO buffer 254. FIFO buffers are storage devices that may output the stored data in the order the data was received. After being stored in the AI FIFO buffer 254, the digitized data may be sent to the bus interface unit 258. In one embodiment, the bus interface unit 258 may be coupled to the communication medium 130 for sending data to and receiving data from a computer system (e.g., computer system 101 of FIG. 1). The bus interface unit 258 may be operable to implement the protocol associated with the type of bus coupled to the DAQ device 102. As described above, exemplary buses coupled to the bus interface unit 258 include a PCI, PCI Express, USB, EEEE 1394, PXI bus, or Ethernet, among others. In one embodiment, the bus interface unit 258 may send the digitized data to the computer system 101 for storage and analysis of the data.

As described above, the computer system (e.g., computer system 101 of FIG. 1) may provide digital signals to the DAQ device 102 to stimulate a UUT. In one embodiment, the digital signals may need to be converted to analog form to stimulate the UUT. Therefore, in this embodiment, after the ASIC 250 of DAQ device 102 receives the digital signals and stores them in AO FIFO buffer 256, the digital data may be transmitted to DAC 245A to be converted to analog form. The ASIC 250 may receive the digital data from the computer system at the programmable DAC interface 280. The programmable DAC interface 280 may be a flexible converter interface that is programmable to support both parallel and serial DACs. The DAC interface 280 may perform data conversions and other operations on digital data to be sent to one or more DACs, so the DACs receive the data in a particular format. For example, the programmable DAC interface 280 may be programmed to convert the digital data, e.g., from two's complement to straight binary form. As described below with reference to FIG. 4, the programmable DAC interface 280 may be programmed with other parameters to interface with various types of parallel and serial DACs and to allow for future expandability.

The programmable DAC interface 280 of ASIC 250 may send the digital data to the DAC 245A. DACs are devices that convert discrete (digital) signals into continuously varying (analog) signals. For example, if an analog signal was initially converted to digital form, a DAC may be able to reproduce the analog signal if provided with the digital data. It is noted that the DAQ device 102 may comprise any number of DACs, for example, other embodiments may include a single DAC or four DACs. After the digital data is converted to analog form, the analog signals may be sent to the I/O connector 202 via the analog output line 235A.

In one embodiment, digital signals may be received at the I/O connector 202. The received digital signals may be sent to the ASIC 250 via one or more of the digital I/O lines 225A-D. In one embodiment, the digital I/O lines 225A-D are general-purpose, bidirectional digital I/O lines, which may be configured to send and receive digital data. When the ASIC 250 receives the digital signals, the data may be stored in the DI/DO FIFO buffer 255. After being stored in the DI/DO FIFO buffer 255, the digital data may be sent to the bus interface unit 258, which may convey the digital data to the computer system 101, as described above. It is noted that digital data received via the bus interface unit 258 may also be stored in DI/DO FIFO buffer 255 before being sent to the I/O connector 202 via one or more of the digital I/O lines 225A-D.

The ASIC 250 may include the timing and control unit 252 to provide timing and control and data management functions for the DAQ device 102 during, e.g., a data acquisition process. The timing and control unit may comprise one or more counter/timers, which may be used in various applications, including counting the occurrences of a digital event, digital pulse timing, and generating square waves and pulses. The timing and control unit 252 may be coupled to the programmable ADC interface 270, the programmable DAC interface 280, and one or more of the FIFO buffers (e.g., AO FIFO buffer 256) of the DAQ device 102 to provide timing and control signals for storing data received from, e.g., the bus interface 258 or the programmable ADC interface 270, and for sending data from, e.g., the AO FIFO buffer 256 to the programmable DAC interface 280 and then to the DAC 245A. Furthermore, the timing and control unit 252 may be coupled to the ADCs (e.g., ADC 215A) and DACs (e.g., ADC 245A) of the DAQ device 102 to provide timing and control signals for performing the data conversion functions that may be necessary in a data acquisition process.

In one embodiment, the programmable ADC interface 270, the programmable DAC interface 280, the timing and control unit 252, and/or the bus interface unit 258 may be implemented in hardware. In a further embodiment, the programmable ADC interface 270, the programmable DAC interface 280, the timing and control unit 252, and/or the bus interface unit 258 may be implemented in software. In yet another embodiment, the programmable ADC interface 270, the programmable DAC interface 280, the timing and control unit 252, and/or the bus interface unit 258 may be implemented in both hardware and software. In one embodiment, the functionality described above with regard to the programmable ADC interface 270, the programmable DAC interface 280, the timing and control unit 252, and/or the bus interface unit 258 may be distributed across multiple components. In various embodiments, this type of functional distribution may also apply to other components described herein.

It is noted that in other embodiments the programmable ADC interface 270 and/or DAC interface 280 may be included in various types of analog-to-digital and digital-to-analog systems or devices besides a data acquisition device, for example, any system or device typically including one or more converter interfaces, such as measurement and instrumentation devices, modems, and temperature monitoring devices, among others. It is also noted that other types of ICs besides an ASIC (e.g., ASIC 250) may include the programmable ADC interface 270 and/or DAC interface 280.

Programmable ADC Interface

Figure 3:
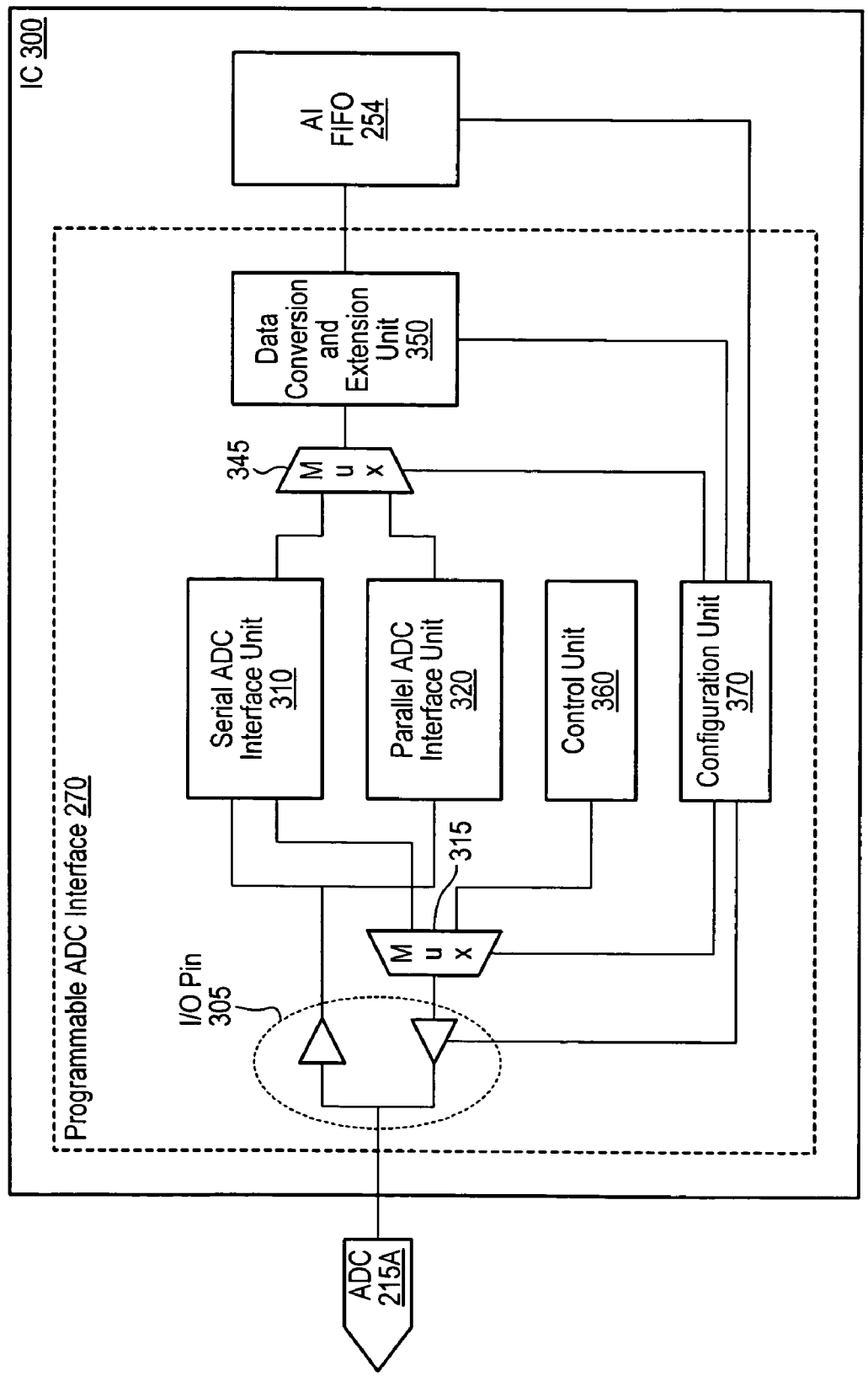
FIG. 3 is a block diagram of one embodiment of a flexible converter interface for interfacing with an analog-to-digital converter (ADC)

Turning now to FIG. 3, a block diagram of one embodiment of a flexible converter interface for interfacing with an analog-to-digital converter (ADC) is shown. Components that correspond to those shown in FIG. 2 are numbered identically for simplicity and clarity. As described above, the programmable ADC interface 270 may be a flexible converter interface that is programmable to support both parallel and serial ADCs. In one embodiment, the programmable ADC interface 270 may be an IC, for example, a digital IC. The programmable ADC interface 270 may be coupled to the ADC 215A to receive digital signals and may be programmable to perform data conversions and other operations on the received digital data to send the data to the computer system (e.g., computer system 101 of FIG. 1) in a desired form. As will be described further below, the programmable ADC interface 270 may be programmed with other parameters to interface with various types of parallel and serial ADCs and to allow for future expandability.

In one embodiment, the programmable ADC interface 270 may be comprised in an IC 300 (e.g., the ASIC 250) that may be included in a measurement device (e.g., the data acquisition device 102 of FIG. 2). The programmable ADC interface 270 may be coupled to an ADC (e.g., the ADC 215A) and an AI buffer (e.g., AI FIFO buffer 254). The programmable ADC interface 270 may comprise a plurality of general-purpose I/O pins (e.g., I/O pin 305), a serial ADC interface unit 310, a parallel ADC interface unit 320, a multiplexer (MUX) 345, a data conversion and extension unit 350, a control unit 360, and a configuration unit 370. It should be noted that the components described with reference to FIG. 3 are meant to be exemplary only, and are not intended to limit the invention to any specific set of components or configurations. For example, in various embodiments, one or more of the components described may be omitted, combined, modified, or additional components included, as desired.

The programmable ADC interface 270 may include the configuration unit 370, which may be programmed with an ADC type parameter, an ADC resolution parameter, and an ADC data type parameter, among others. The programmed state of each of the parameters may depend on the characteristics of the one or more ADCs that are connected to the programmable ADC interface 270. For example, ADC 215A may be a parallel or a serial ADC, may have a resolution of between 12 and 24 bits, and may output data in either straight binary or two's complement form.

To support the largest set of current and upcoming ADCs, the programmable ADC interface 270 may function as either a programmable parallel ADC interface or a programmable serial ADC interface depending upon a programmed ADC type parameter (i.e., converter type parameter). The programmable ADC interface 270 may function as a programmable parallel ADC interface when the programmed ADC type parameter indicates a parallel mode of operation and as a programmable serial ADC interface when the programmed ADC type parameter indicates a serial mode of operation. If the programmable ADC interface 270 is connected to a serial ADC (e.g., ADC 215A), then the configuration unit 370 of the ADC interface 270 may be programmed with an ADC type parameter to configure the ADC interface 270 to support a serial ADC. Similarly, if the programmable ADC interface 270 is connected to a parallel ADC (e.g., ADC 215A), then the configuration unit 370 of the ADC interface 270 may be programmed with an ADC type parameter to configure the ADC interface 270 to support a parallel ADC. For example, performing a register write to a register of the configuration unit 370 with the ADC type parameter may personalize the ADC interface 270 accordingly. It is noted however that the ADC interface 270 may be programmed by other methods.

In one embodiment, when the ADC 215A is a serial ADC, the programmable ADC interface 270 may be programmed to function as a programmable serial ADC interface. In this embodiment, when the programmed ADC type parameter indicates a serial mode of operation, the serial data received from the ADC 215A may be sent to the serial ADC interface unit 310. The configuration unit 370 may be programmed with various parameters to configure the serial ADC interface unit 310 to support various serial ADCs. For example, the communication protocol implemented by a first serial ADC may be different compared to the protocol implemented by a second serial ADC. Therefore, the programmable ADC interface 270 may be programmed differently when it is connected to the first serial ADC than when it is connected to the second serial ADC. In one embodiment, when the ADC interface 270 is in a serial mode of operation, to configure the serial ADC interface unit 310 accordingly, the configuration unit 370 may be programmed with the following programmable parameters: programmable number of bits to serially shift in, programmable 3-wire or 4-wire ADC mode, programmable clock idle state, programmable free-running clock mode, programmable data latching edge, programmable clock high and low phases, programmable CS functionality (through shifting), programmable conversion time, and programmable serial sync input and polarity, among others. Furthermore, the serial ADC interface includes the following features: programmable 50% duty cycle extension on AI serial, and resolution programmable and MSB/LSB first programmable shift register, among others.

In addition, the serial ADC interface unit 310 may convert the received serial data into parallel data, so the data conversion and extension unit 350 may format the data accordingly before being sent to, e.g., the computer system 101. For example, the serial ADC interface unit 310 may convert the serial data to 24-bit parallel data. It is noted however that in other embodiment the serial ADC interface unit 310 may convert the serial data to other forms of parallel data, such as 32-bit parallel data.

In one embodiment, when the ADC 215A is a parallel ADC, the programmable ADC interface 270 may be programmed to function as a programmable parallel ADC interface. In this embodiment, when the programmed ADC type parameter indicates a parallel mode of operation, the parallel data may be sent from the ADC 215A to the parallel ADC interface unit 320.

After the data flows through the serial ADC interface unit 310 or the parallel ADC interface unit 320, the MUX 345 may select one of the data lines depending on the programmed ADC type parameter. As shown in FIG. 3, the configuration unit 370 may be coupled to the MUX 345 to control the selection of one of the data lines depending on the programmed ADC type parameter. More specifically, if the programmed ADC type parameter indicates a serial mode of operation, then the data path including the serial ADC interface unit 310 may be selected, and if the programmed ADC type parameter indicates a parallel mode of operation, then the data path including the parallel ADC interface unit 320 may be selected. It is noted that the IC 300 may include one or more multiplexers (e.g., MUX 345) and each one of the multiplexers may be coupled to each of the plurality of I/O pins (e.g., I/O pin 305). It is also noted that in other embodiments various devices may be used to select one of the data lines instead of a multiplexer (e.g., MUX 345). After the data lines corresponding to either the serial ADC interface unit 310 or the parallel ADC interface unit 320 are selected by MUX 345, the data may be sent to data conversion and extension unit 350 to determine whether to perform a data conversion or a sign extension operation on the data, as will be described further with reference to FIG. 4.

The configuration unit 370 of the programmable ADC interface 270 may also be programmed with an ADC resolution parameter corresponding to the resolution of the ADC (e.g., a parallel ADC 215A) connected to the ADC interface 270. For example, if the ADC 215A has an 18-bit resolution, then the programmable ADC interface 270 may be programmed with the ADC resolution by performing a register write (e.g., 0b10010 to address 0x11010) to a register in the configuration unit 370. It is noted however that the ADC interface 270 may be programmed by other methods. The ADC resolution may affect how the ADC interface 270 handles and stores the data; therefore, to provide a flexible converter interface, the ADC resolution is preferably programmable to configure the ADC interface 270 to support a variety of ADCs having various resolutions.

The configuration unit 370 may be coupled to each of the plurality of general-purpose I/O pins (e.g., I/O pin 305). As shown in FIG. 3, each of the plurality of general-purpose I/O pins may include a bidirectional buffer to drive data in an input or an output direction. The programmed ADC resolution and the programmed ADC type parameter of the ADC interface 270 may control the function of the plurality of general-purpose I/O pins. For example, the programmable ADC interface 270 may include 24 general-purpose I/O pins, the programmed ADC resolution may be 18 bits, and the programmed ADC type parameter may indicate a parallel mode of operation. In this example, 18 general-purpose I/O pins (e.g., I/O pin 305) may be configured as input pins to receive the ADC data from the ADC 215A, and the remaining 6 I/O pins may be configured to perform other functions (e.g., output a digital dither signal). Therefore, depending on the programmed ADC resolution and the programmed ADC type parameter, the I/O pin 305 may be configured as an ADC data input pin or as an output pin. Rather than dedicating lines to converter communications, which may increase pin count, the I/O pins are configurable to perform other functions (as will be further described below) and therefore may reduce the pin count of the IC 300.

In one embodiment, one or more I/O pins of the ADC interface unit 270 may be configured to perform other output functions (e.g., output a digital dither signal) if the necessary number of I/O pins required to communicate with the ADC is less than a programmed maximum value. The number of I/O pins necessary may be determined by the programmed ADC type parameter and the programmed ADC resolution, which correspond to the type (i.e., serial or parallel) and resolution of an ADC coupled to the ADC interface 270. The maximum value may vary depending upon the number of pins that are available to the ADC interface unit 270. For example, if 24 pins are available to the ADC interface unit 270, then the maximum value may be 24. In this example, for a parallel ADC, if the ADC resolution is less than 24, then one or more pins may be configured to perform other functions (e.g., output static analog control signals). In another example, for a serial ADC, only 3 or 4 I/O pins may be required for communication independent of the ADC resolution. In this example, 21 or 20 I/0 pins, respectively, may be available for other functions. It is noted that any number of pins may be available to the ADC interface unit 270.

In one embodiment, if the ADC communication requires less than the maximum value of I/O pins (e.g., as described above), the control unit 360 may implement one or more other functions via the I/O pins that are not configured to receive the ADC data. For example, depending on the programmed ADC resolution, I/O pin 305 may be configured as an output. In this example, the control unit 360 may output a unipolar/bipolar control signal, a digital dither control signal, or static analog control signals via one or more of the I/O pins (e.g., I/O pin 305) of the ADC interface 270. The control signals may be used to control other aspects of the data acquisition process, e.g., control filters, multiplexers, or amplifiers.

In one embodiment, when the ADC type parameter indicates a serial mode of operation, the I/O pin 305 may be configured to send an output signal (e.g., a CS signal or a clock signal) to the corresponding ADC to control the sending of ADC data in one of the data lines. In one example, in a serial mode of operation, only 4 lines may be required for communicating with the ADC independent of the ADC resolution. All other I/O pins (e.g., 20 pins) may be configured to perform some of the other output functions described above or alternative functions. In one embodiment, when the ADC type parameter indicates a parallel mode of operation, the programmed ADC resolution may control the I/O buffer direction. If the line is required for ADC communication, the I/O pin may be configured as an input and the data routed to the parallel ADC interface unit 320. If the I/O pin is not required for the ADC communication, then the multiplexer (MUX 315) may select the data line connected to the control unit 360 (e.g., to perform other functions, such as outputting a digital dither signal). For example, if the programmed ADC resolution indicates that the I/O pin 305 is one the I/O pins needed to send control signals to the ADCs, then the MUX 315 may be configured to select the data line coupled to the control unit 360, e.g., to transmit a Reset signal or a range select signal to the corresponding ADC.

As shown in FIG. 3, the configuration unit 370 may also be coupled to the AI buffer, e.g., AI FIFO buffer 254. The ADC resolution parameter of the configuration unit 370 may control the configuration of the AI FIFO buffer 254. In one embodiment, the AI FIFO buffer 254 may comprise two blocks of RAM that are 16-bits wide. In this embodiment, if the programmed ADC resolution is less than or equal to 16 bits, then the blocks of RAM may be connected in a serial configuration to increase the depth of the A1 FIFO buffer 254. On the other hand, if the programmed ADC resolution is greater than 16 bits, then the blocks of RAM may be connected in a parallel configuration to increase the width of the AI FIFO buffer 254 to 32 bits. In both of these examples, the AI FIFO buffer 254 may be configured to accommodate the storage requirements due to a particular programmed ADC resolution. It is noted however that in other embodiments the AI buffer may comprise three or more blocks of RAM. It is also noted that the AI buffer may be configured in other ways to vary the depth and/or width therein.

ADC Data Conversion and Extension Unit

Figure 4:
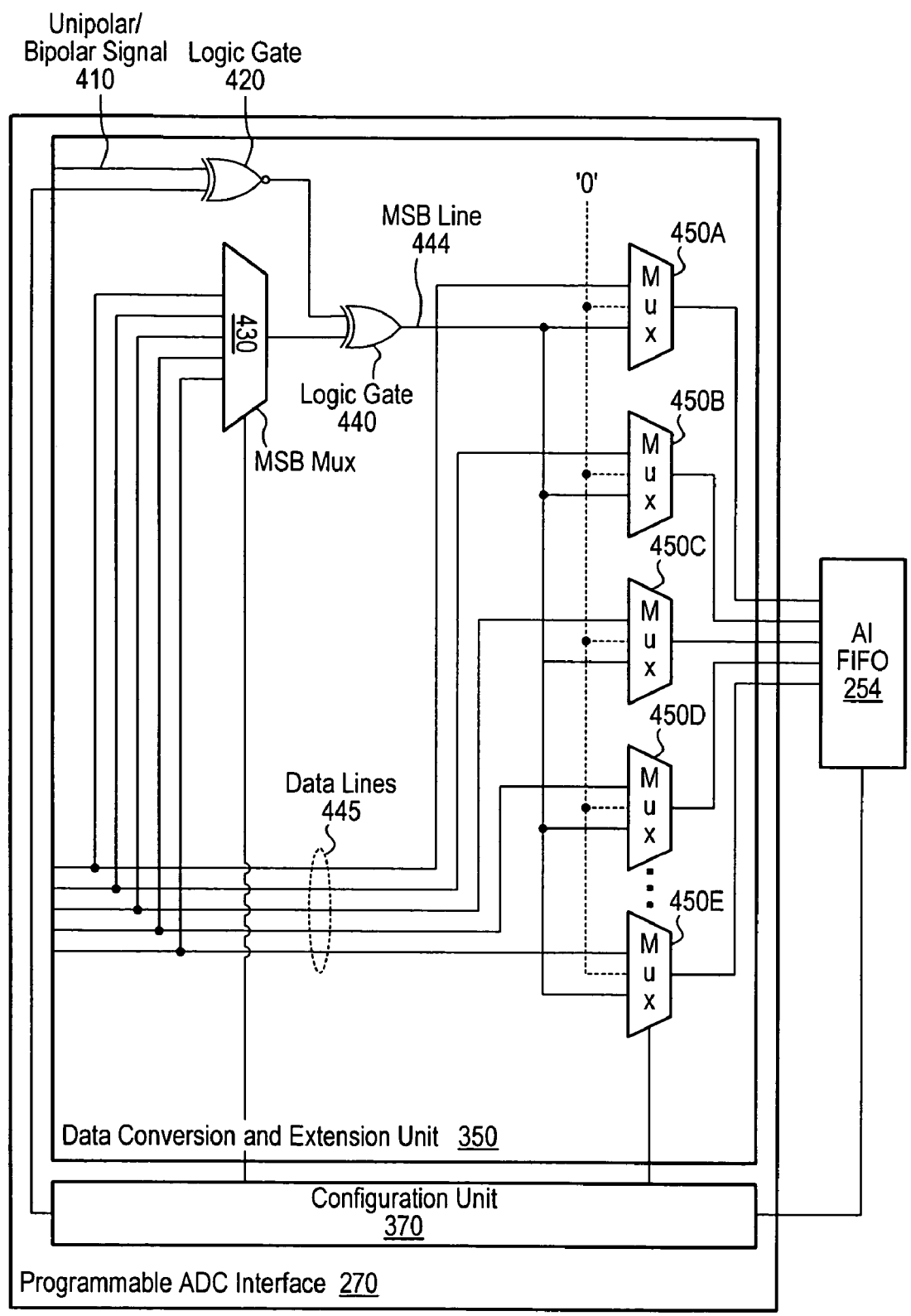
FIG. 4 is a block diagram of one embodiment of a data conversion and extension unit comprised in a programmable ADC interface.

FIG. 4 is a block diagram of one embodiment of a data conversion and extension unit 350 comprised in the programmable ADC interface 270. Components that correspond to those shown in FIG. 3 are numbered identically for simplicity and clarity. As described above, the configuration unit 370 of the programmable ADC interface 270 may be programmed with the ADC data type parameter. A programmed ADC data type parameter may indicate whether an ADC (e.g., ADC 215A) is configured to send ADC data to the programmable ADC interface 270 in straight binary or two's complement form. The computer system (e.g., computer system 101 of FIG. 1) may need to receive data in a particular form. For example, if unipolar data (e.g., voltages from 0V to 10V) is received at the DAQ device 102, then the computer system 101 may need to receive the digitized data in straight binary form. Also, in another example, if bipolar data (e.g., voltages from −10V to 10V) is received at the DAQ device 102, then the computer system 101 may need to receive the digitized data in two's complement form. Therefore, the ADC interface 270 may include the data conversion and extension unit 350, which may be operable to perform a data conversion on the ADC data received from the ADC 215A depending on the programmed ADC data type parameter (i.e., straight binary or two's complement) and on the type of data (i.e., unipolar or bipolar) received at the DAQ device 102.

The type of analog signal (e.g., voltage) received at the DAQ device 102 may be determined from a unipolar/bipolar signal 410 (i.e., a data type signal) received at the ADC interface 270. The unipolar/bipolar signal 410 may be a digital signal that indicates whether a unipolar analog signal or a bipolar analog signal was received at the DAQ device 102.

The data conversion and extension unit 350 may comprise a logic gate 420, an MSB (most significant bit) multiplexer (MUX) 430, a logic gate 440, and a plurality of MUXs 450A-E. It should be noted that the components described with reference to FIG. 4 are meant to be exemplary only, and are not intended to limit the invention to any specific set of components or configurations. For example, in various embodiments, one or more of the components described may be omitted, combined, modified, or additional components included, as desired.

In one embodiment, the data selected by the MUX 345 of FIG. 3 may be sent to the data conversion and extension unit 350. In the data conversion and extension unit 350, the MSB MUX 430 may select the MSB of the data depending on the programmed ADC resolution. As shown, the configuration unit 370 may be coupled to the MSB MUX 430 to configure the MSB MUX 430 to select the MSB of the received data depending on the programmed ADC resolution. For example, if the programmed ADC resolution is 18 bits, then the MSB of the received data may be the $18^{th}$ bit or bit 17 of bits 0-17. More specifically, in this example, the MSB MUX 430 may select line 17 out of lines 0-17 to select the MSB of the received data.

In addition, the data conversion and extension unit 350 may determine whether a data conversion needs to be performed on the received data depending on the unipolar/bipolar signal 410 and the programmed ADC data type parameter. The MSB may be sent to logic gate 440 (e.g., an XOR gate), which may function like a programmable inverter depending on a second input signal. The second input signal of the logic gate 440 may be derived based on the unipolar/bipolar signal 410 and the programmed ADC data type parameter programmed in configuration unit 370. In one embodiment, these signals may be input into logic gate 420 (e.g., an XNOR gate). If the unipolar/bipolar signal 410 indicates that unipolar data was received at the DAQ device 102 and the programmed ADC data type parameter indicates the ADC 215A digitized the data in two's complement form (before transmitting the data to the ADC interface 270), the MSB may be inverted to convert the data from two's complement to straight binary form. Also, if the unipolar/bipolar signal 410 indicates that bipolar data was received at the DAQ device 102 and the programmed ADC data type parameter indicates the ADC 215A digitized the data in straight binary form, the MSB may be inverted to convert the data from straight binary to two's complement form. On the other hand, if the unipolar/bipolar signal 410 indicates that unipolar data was received at the DAQ device 102 and the programmed ADC data type parameter indicates the ADC 215A digitized the data in straight binary form, the MSB may not be inverted and a data conversion operation may not be performed on the received data. Additionally, if the unipolar/bipolar signal 410 indicates that bipolar data was received at the DAQ device 102 and the programmed ADC data type parameter indicates the ADC 215A digitized the data in two's complement form, the MSB may not be inverted and a data conversion operation may not be performed on the received data.

The inverted or uninverted MSB of the received data is output from the logic gate 440 and sent to the MUXs 450A-450E (e.g., via MSB line 444). It is noted however that the data conversion and extension unit 350 may include any number of MUXs (e.g., twenty-four MUXs 450 or thirty-two MUXs 450). For example, the number of MUXs may correspond to the maximum number of bits that may be stored in the AO FIFO 256. The data received at the data conversion and extension unit 350 may also be sent to the MUXs 450A-450E (e.g., via data lines 445).

The data conversion and extension unit 350 may also determine whether to perform an extension operation (e.g., either sign extension or non-sign extension) on the received digital data depending on the programmed ADC resolution. In one embodiment, the data conversion and extension unit 350 may comprise logic that performs an extension operation on the received ADC data depending upon whether the programmed ADC resolution is equal to one or more predetermined values. The predetermined values may be 16 bits or 32 bits because the data may need to be returned to the computer system (e.g., computer system 101 of FIG. 1) in bytes, for example, 2 bytes (i.e., 16 bits) or 4 bytes (32 bits) at a time. The received data may need to be sign extended or non-sign extended, i.e., extra bits may need to be added to the data, to conform to this requirement. If the programmed ADC resolution is equal to the one or more predetermined values, then an extension operation may not be required. For example, if the programmed ADC resolution is 16 bits and therefore 16-bit data is received, then the data may not be sign extended. If the programmed ADC resolution is not equal to the one or more predetermined values, then the data conversion and extension unit 350 may perform an extension operation by adding extra bits to the received ADC data. For example, if the programmed ADC resolution is 12 bits and therefore 12-bit data is received, then the data may be sign extended to 16 bits (i.e., to one of the predetermined values). In a further example, if 24-bit data is received, then the data may be sign extended to 32 bits. In one embodiment, the data conversion and extension unit 350 may add a particular number of extra bits so that the number of bits associated with the ADC data equals one of the predetermined values. It is however noted that in other embodiments data may not need to be returned to the computer system in a particular form; therefore, data may not need to be extended.

The MUXs 450A-450E may be used to perform any necessary sign extension or non-sign extension. Based on the programmed ADC resolution and the unipolar/bipolar signal 410, the MUXs 450A-450E may select one of three lines for each bit. The three lines coupled to each of the MUXs 450A-450E may include: an MSB line 444 including the MSB (whether inverted or not inverted) that may have been selected by MSB MUX 430, a line tied to a logic low ('0'), and one of the plurality of digital data lines 445. In one embodiment, the digital data lines 445 (e.g., sent from MUX 345 of FIG. 3) are selected for bits that are in a position less than the programmed ADC resolution. For example, if the programmed ADC resolution is 18 bits (e.g., bits 0-17), then the corresponding MUXs may select the digital data lines for the $1^{st}$ through the $17^{th}$ bits (e.g., bits 0-16). In one embodiment, the MSB line 444 may be selected for the bit in the position equal to the programmed ADC resolution. For instance, in the example described above, the MSB line 444 may be selected for the $18^{th}$ bit (e.g., bit 17).

To sign extend or non-sign extend the digital data, either the MSB line 444 or the logic low line may be selected to add extra bits to the received data, i.e., in bit positions greater than the programmed ADC resolution. If the unipolar/bipolar signal 410 indicates that unipolar signals were received at the DAQ device 102, which may indicate that data in straight binary form (with no sign bit) may be sent to, e.g., the computer system 101 of FIG. 1, the digital data may be non-sign extended by selecting the logic low line for the extra bits that are in a position greater than the programmed ADC resolution. For example, if the programmed ADC resolution is 12 bits, then to non-sign extend the data to 16 bits, the logic low line may be selected for each of the $13^{th}$ through the $16^{th}$ bits (e.g., bits 12-15). If the unipolar/bipolar signal 410 indicates that bipolar signals were received at the DAQ device 102, which may indicate that data in two's complement form (with a sign bit) may be sent to, e.g., the computer system 101 of FIG. 1, the digital data may be sign extended by selecting the MSB line 444 (whether the MSB was inverted or not inverted) for the extra bits that are in a position greater than the programmed ADC resolution. For example, if the programmed ADC resolution is 12 bits, then to sign extend the data to 16 bits, the MSB line 444 may be selected for the $13^{th}$ through the $16^{th}$ bits (e.g., bits 12-15).

In one embodiment, a portion of the MUXs 450A-450E may only be connected to the MSB line 444 and the logic low line, to either sign extend or non-sign extend the digital data. For example, if the data conversion and extension unit 350 includes thirty-two MUXs (e.g., MUXs 450A-450E), then twenty-four of the MUXs may be connected to the three lines (as described above) and the remaining eight MUXs may only be connected to the MSB line 444 and the logic low line. In one embodiment, if the extension operation is not necessary for a particular data, the portion of the MUXs used only to perform extension operations (e.g., either sign extension or non-sign extension) may not be used or may be disabled. It is noted that in other embodiments various devices may be used to select one of the data lines instead of multiplexers (e.g., MUXs 450A-450E). In one embodiment, the digital data output from the data conversion and extension unit 350 may be stored in the AI FIFO buffer 254 before being sent to, e.g., the computer system 101.

Programmable DAC Interface

Figure 5:
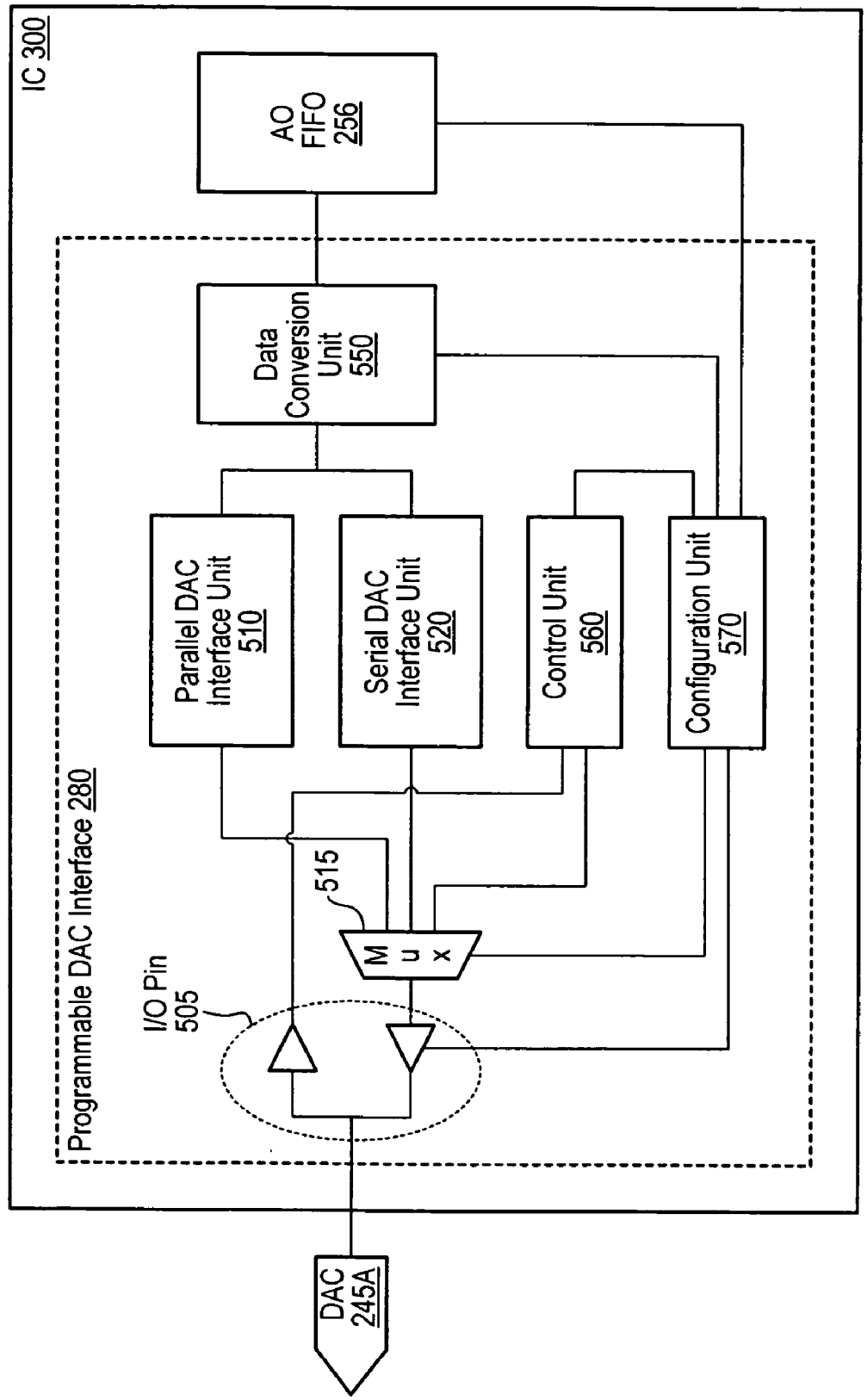
FIG. 5 is a block diagram of one embodiment of a flexible converter interface for interfacing with a digital-to-analog converter (DAC)

FIG. 5 is a block diagram of one embodiment of a flexible converter interface for interfacing with a digital-to-analog converter (DAC). Components that correspond to those shown in FIGS. 2 and 3 are numbered identically for simplicity and clarity. As described above, the programmable DAC interface 280 may be a flexible converter interface that is programmable to support both parallel and serial DACs. In one embodiment, the programmable DAC interface 280 may be an IC, for example, a digital IC. The programmable DAC interface 280 may be coupled to one or more DACs (e.g., DAC 245A) and may be programmable to perform data conversions and other operations on digital data received from a computer system (e.g., the computer system 101 of FIG. 1) to send the data to the DACs in a particular format. In one embodiment, as described above, the digital data may be sent to the DACs to generate analog signals used for stimulating a UUT. The programmable DAC interface 280 may be programmed with other parameters to interface with various types of parallel and serial DACs and to allow for future expandability, as will be described further below.

In one embodiment, the programmable DAC interface 280 may be comprised in the IC 300 (e.g., the ASIC 250 of FIG. 2) that may be included in a measurement device (e.g., the data acquisition device 102 of FIG. 2). The programmable DAC interface 280 may be coupled to an AO buffer (e.g., AO FIFO buffer 256) and a DAC (e.g., DAC 245A). The programmable DAC interface 280 may comprise a plurality of general-purpose I/O pins (e.g., I/O pin 505), a serial DAC interface unit 520, a parallel DAC interface unit 510, a multiplexer (MUX) 515, a data conversion unit 550, a first control unit 560, and a configuration unit 570. It should be noted that the components described with reference to FIG. 5 are meant to be exemplary only, and are not intended to limit the invention to any specific set of components or configurations. For example, in various embodiments, one or more of the components described may be omitted, combined, modified, or additional components included, as desired.

The programmable DAC interface 280 may include the configuration unit 570, which may be programmed with a DAC type parameter, a DAC resolution parameter, and a DAC data type parameter, among others. The programmed state of each of the parameters depends on the characteristics of the one or more DACs that are connected to the programmable DAC interface 280. For example, DAC 245A may be a parallel or a serial DAC, may have a resolution of between 12 and 24 bits, and may be configured to receive digital data in either straight binary or two's complement form.

The digital data transmitted from, e.g., computer system 101 of FIG. 1, may be stored at AO FIFO buffer 256 and then sent to data conversion unit 550. The data conversion unit 550 may convert the data from two's complement to straight binary form (or vice versa) depending on the programmed DAC data type parameter, as will be described further below with reference to FIG. 6. The programmed DAC data type parameter may indicate in what form the corresponding DACs receive digital data. For example, if the programmed DAC data type parameter indicates that the DACs are configured to receive data in straight binary form and the computer system outputs data to the IC 300 in two's complement form, the data conversion unit 550 may convert the received digital data from two's complement to straight binary form. The data may then be sent to either the parallel DAC interface unit 510 or the serial DAC interface unit 520.

To support the largest set of existing and upcoming DACs, the programmable DAC interface 280 may function as either a programmable parallel DAC interface or a programmable serial DAC interface depending upon a programmed DAC type parameter (i.e., converter type parameter). The programmable DAC interface 280 may function as a programmable parallel DAC interface when the programmed DAC type parameter indicates a parallel mode of operation and as a programmable serial DAC interface when the programmed DAC type parameter indicates a serial mode of operation. If the programmable DAC interface 280 is connected to a serial DAC (e.g., DAC 245A), then the configuration unit 570 of the DAC interface 280 may be programmed with a serial DAC type parameter to configure the DAC interface 280 to support a serial DAC. Similarly, if the programmable DAC interface 280 is connected to a parallel DAC (e.g., DAC 245A), then the configuration unit 570 of the DAC interface 280 may be programmed with a parallel DAC type parameter to configure the DAC interface 280 to support a parallel DAC. For example, performing a register write to a register of the configuration unit 570 with the DAC type parameter may personalize the DAC interface 280 accordingly. It is noted however that the DAC interface 280 may be programmed by other methods.

In one embodiment, when the DAC 245A is a serial DAC, the DAC interface 280 is programmed to function as a programmable serial DAC interface. In this embodiment, when the programmed DAC type parameter indicates a serial mode of operation, the digital data may be sent from the data conversion unit 550 to the serial DAC interface unit 510. The configuration unit 570 may be programmed with various parameters to configure the serial DAC interface unit 510 to support various serial DACs. For example, the communication protocol implemented by a first serial DAC may be different compared to the protocol implemented by a second serial DAC. Therefore, the programmable DAC interface 280 may be programmed differently when it is connected to the first serial DAC than when it is connected to the second serial DAC. In one embodiment, when the DAC interface 280 is in a serial mode of operation, to configure the serial DAC interface unit 510 accordingly, the configuration unit 570 may be programmed with the following programmable parameters: programmable number of bits to shift in, programmable 3-wire or 4-wire DAC mode, programmable clock idle state, programmable free-running clock mode, programmable data output edge, programmable data latching edge, programmable clock high and low phases, and programmable CS functionality (through shifting), among others.

In addition, the serial DAC interface unit 510 may convert the received parallel data into serial data, to send the data in serial form to the corresponding serial DAC (e.g., DAC 245A). For example, the serial DAC interface unit 510 may convert 24-bit parallel data into serial data. It is noted however that in other embodiment the serial DAC interface unit 510 may convert other forms of parallel data, e.g., 32-bit parallel data, to serial data.

In one embodiment, when the DAC 245A is a parallel DAC, the programmable DAC interface 280 may be programmed to function as a programmable parallel DAC interface. In this embodiment, when the programmed DAC type parameter indicates a parallel mode of operation, the parallel data may be sent from the data conversion unit 550 to the parallel DAC interface unit 520.

After the data flows through the serial DAC interface unit 510 or the parallel DAC interface unit 520, the MUX 515 may select one of the data lines depending on the programmed DAC type parameter. As shown in FIG. 5, the configuration unit 570 may be coupled to the MUX 515 to control the selection of the data paths depending on the programmed DAC type parameter. More specifically, if the programmed DAC type parameter indicates a serial mode of operation, then the data path including the serial DAC interface unit 520 may be selected, and if the programmed DAC type parameter indicates a parallel mode of operation, then the data path including the parallel DAC interface unit 510 may be selected. In one embodiment, if the I/O pin (e.g., I/O pin 505) coupled to the MUX 515 is not configured to function as a DAC data output, the MUX 515 may also select the data line connected to the control block 560 to implement other functions, as will be described further below. It is noted that the IC 300 may include one or more multiplexers (e.g., MUX 515) and each one of the multiplexers may be coupled to each of the plurality of I/O pins (e.g., I/O pin 505). It is also noted that in other embodiments various devices may be used to select one of the data lines instead of a multiplexer (e.g., MUX 515).

The configuration unit 570 of the programmable DAC interface 280 may also be programmed with a DAC resolution parameter corresponding to the resolution of the DAC (e.g., a parallel DAC 245A) connected to the DAC interface 280. For example, if the DAC 245A has an 18-bit resolution, then the programmable DAC interface 280 may be programmed with the DAC resolution by performing a register write (e.g., 0b10010 to address 0x11010) to a register in the configuration unit 570. It is noted however that the DAC interface 280 may be programmed by other methods. The DAC resolution may affect how the DAC interface 280 handles and stores the data; therefore, to provide a flexible converter interface, the DAC resolution is preferably programmable to configure the DAC interface 280 to support a variety of DACs having various resolutions.

The configuration unit 570 may be coupled to each of the plurality of general-purpose I/O pins (e.g., I/O pin 505). As shown in FIG. 5, each of the plurality of general-purpose I/O pins may include a bidirectional buffer to drive data in an input or an output direction. The programmed DAC resolution and the programmed DAC type parameter of the DAC interface 280 may control the function of the plurality of general-purpose I/O pins. For example, the programmable DAC interface 280 may include 32 general-purpose I/O pins, the programmed DAC resolution may be 16 bits, and the programmed DAC type parameter may indicate a parallel mode of operation. In this example, 16 general-purpose I/O pins (e.g., I/O pin 305) may be configured as output pins to send the DAC data from the DAC interface 280 to, e.g., the DAC 245A, and the remaining 16 I/O pins may be configured to perform other functions (e.g., output control signals). For example, one or more of the I/O pins may be used to send control signals for updating the DACs. Depending on the programmed DAC resolution and the programmed DAC type parameter, the I/O pin 305 may be configured as a DAC data output pin, as an output control pin, or as an input control pin. Rather than dedicating lines to converter communications, which may increase pin count, the I/O pins are configurable to perform other functions and therefore may reduce the pin count of the IC 300.

In one embodiment, one or more I/O pins of the DAC interface unit 280 may be configured to perform output or input control functions if the number of I/O pins required for communication with the corresponding DAC is less than a programmed maximum value. The number of I/O pins required for communication with the DAC may be determined by the programmed DAC type parameter and the programmed DAC resolution, which correspond to the type (i.e., serial or parallel) and resolution of the corresponding DAC coupled to the DAC interface 280. The maximum value may vary depending upon the number of pins that are available to the DAC interface unit 280. For example, if 32 pins are available to the DAC interface unit 280, then the maximum value may be 32. In this example, if the programmed DAC resolution is less than 32 and the programmed DAC type parameter indicates a parallel mode of operation, then one or more pins may be configured to perform output or input control functions. It is noted that any number of pins may be available to the DAC interface unit 280.

In one embodiment, if the number of I/O pins required for DAC communication is less than the maximum value, the control unit 560 may implement one or more control functions via a portion of the I/O pins (e.g., the portion of the I/O pins that are not configured to send the DAC data). For example, depending on the programmed DAC resolution and the programmed DAC type parameter, I/O pin 305 may be configured as an input or output control pin. In this example, one or more of the lines may be used as static control lines, such as to control ranges (e.g., whether an output signal is ±1V or ±10V). The I/O pins may also be used to transmit control signals for controlling other aspects of the data acquisition process, e.g., control filters, multiplexers, or amplifiers.

As shown in FIG. 5, the configuration unit 570 may also be coupled to the AO buffer, e.g., AO FIFO buffer 256. The DAC resolution parameter of the configuration unit 570 may also control the configuration of the AO FIFO buffer 256. In one embodiment, the AO FIFO buffer 256 may comprise two blocks of RAM that are 16-bits wide. In this embodiment, if the programmed DAC resolution is less than or equal to 16 bits, then the blocks of RAM may be connected in a serial configuration to increase the depth of the AO FIFO buffer 256. On the other hand, if the programmed DAC resolution is greater than 16 bits, then the blocks of RAM may be connected in a parallel configuration to increase the width of the AO FIFO buffer 256 to 32 bits. In both of these examples, the AO FIFO buffer 256 may be configured to accommodate the storage requirements due to a particular programmed DAC resolution. It is noted however that in other embodiments the AO buffer may comprise three or more blocks of RAM. It is also noted that the AO buffer may be configured in other ways to vary the depth and/or width therein.

DAC Data Conversion Unit

Figure 6:
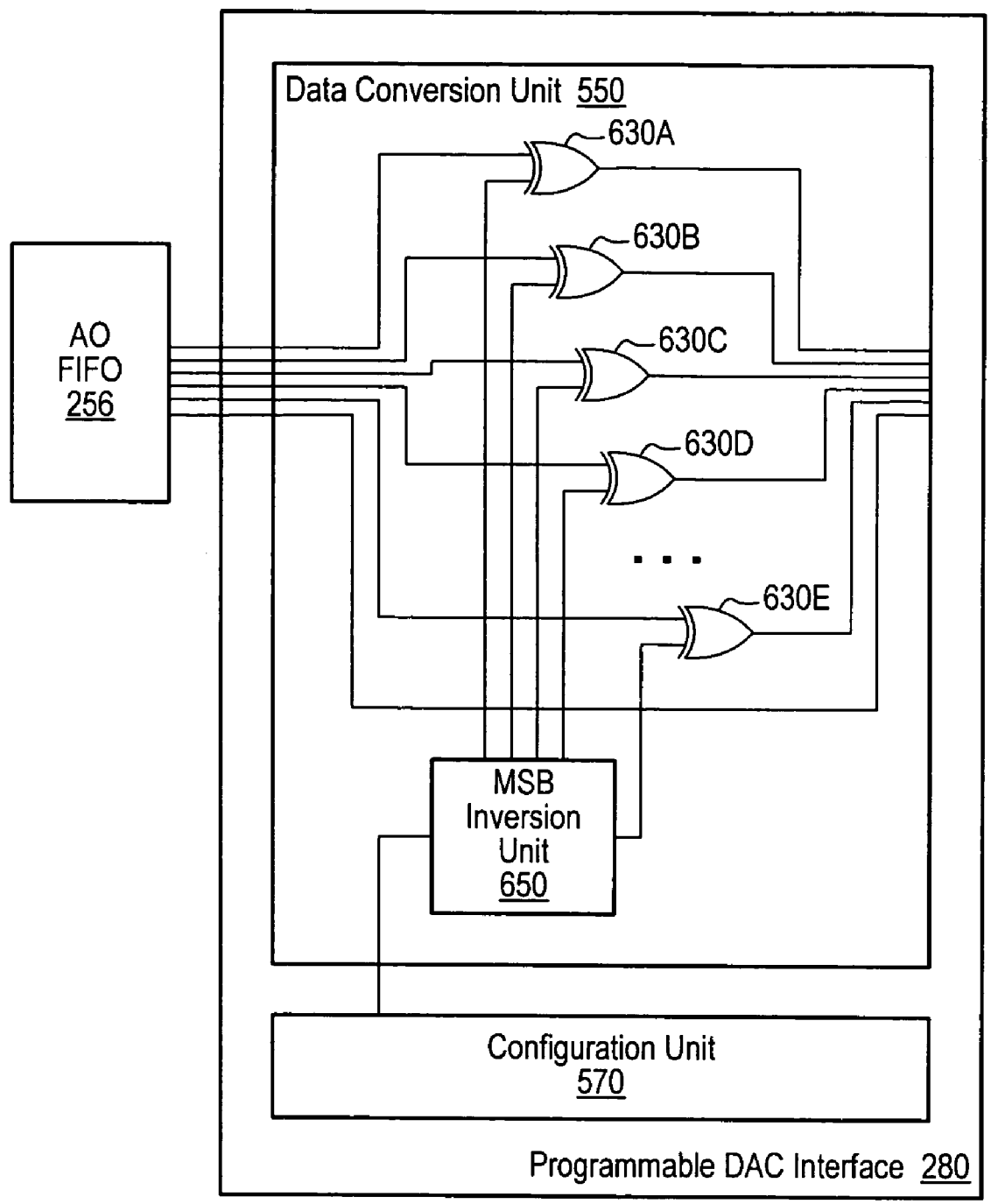
FIG. 6 is a block diagram of one embodiment of a data conversion unit comprised in a programmable DAC interface.

FIG. 6 is a block diagram of one embodiment of a data conversion unit 550 comprised in the programmable DAC interface 280. As described above, the digital data transmitted from, e.g., computer system 101 of FIG. 1 may be stored at AO FIFO buffer 256 and then sent to data conversion unit 550. The data conversion unit 550 may convert the data from two's complement to straight binary form (or vice versa) depending on the programmed DAC data type parameter and the DAC resolution parameter. The programmed DAC data type parameter may indicate in what form the corresponding DACs receive digital data. For example, the programmed DAC data type parameter may indicate that the DACs are configured to receive data in straight binary form. In this example, if the computer system outputs data to the IC 300 (e.g., ASIC 250 of FIG. 2) in two's complement form, the data conversion unit 550 may convert the received digital data from two's complement to straight binary form.

The data conversion unit 550 may comprise logic gates 630A-E (e.g., XOR gates) and an MSB inversion unit 650. It should be noted that the components described with reference to FIG. 6 are meant to be exemplary only, and are not intended to limit the invention to any specific set of components or configurations. For example, in various embodiments, one or more of the components described may be omitted, combined, modified, or additional components included, as desired.

In one embodiment, the MSB inversion unit 650 of the data conversion unit 550 may be coupled to the configuration unit 570 to be configured to perform or not to perform a data conversion on the received digital data. The programmed DAC resolution may be used to determine the MSB of the received data, and the programmed DAC data type parameter may be used to determine whether data conversion is necessary. The MSB inversion unit 650 may invert the bit corresponding to the MSB if programmed DAC data type parameter indicates that data conversion is necessary. For example, if the data received is in straight binary form and the DAC data type parameter indicates a two's complement DAC, then the data conversion may be performed. In this example, if the programmed ADC resolution is 18, then bit 17 (i.e., the MSB) out of bits 0-17 may be inverted. In one embodiment, the MSB inversion unit 650 may invert the MSB of the received data by sending a logic high ('1') to an XOR gate corresponding to bit 17. In this embodiment, the XOR gates 630A-E may be used as programmable inverters to either perform or not perform data conversion on the received data.

In one embodiment, the IC 300 (e.g., the ASIC 250 comprised in the DAQ device 102 of FIG. 2) may include both the programmable ADC interface 270 and the programmable DAC interface 280. In this embodiment, each of the programmable ADC interface 270 and the programmable DAC interface 280 may function as a programmable parallel converter interface or a programmable serial converter interface depending upon a programmed state of a corresponding converter type parameter. It is noted that in other embodiments the programmable ADC interface 270 and/or the programmable DAC interface 280 may be included in various devices besides a data acquisition device (e.g., the DAQ device 102). For example, any device typically including one or more converter interfaces, such as a modem and a temperature monitoring device, among others.

In one embodiment, the ADC interface 270 and the DAC interface 280 may be programmed by a person (e.g., product engineer) or a machine after determining what kind of ADC(s) and DAC(s) are connected to the IC 300. In another embodiment, the ADC interface 270 and the DAC interface 280 may self-program depending on the corresponding ADC(s) and DAC(s). Furthermore, in one embodiment, the ADC interface 270 and the DAC interface 280 may be re-programmable for added flexibility. For example, if the ADC(s) coupled to the ADC interface 270 are replaced, the ADC interface 270 may be re-programmed depending on the type of replacement ADC(s).

In one embodiment, the configuration unit 370 of FIG. 3 and the configuration unit 570 of FIG. 5 may each be programmed with a particular mode of operation. In one embodiment, the programmed ADC or DAC type parameter may indicate the particular mode of operation. For example, the configuration unit 570 of the programmable DAC interface 280 may be programmed with a 2 serial or a 4 serial DAC mode of operation. The 2 serial or the 4 serial DAC mode of operation may indicate that 2 serial DACs or 4 serial DACs, respectively, are coupled to the DAC interface 280. Also, the configuration unit 570 may be programmed with a 2 parallel or a 4 parallel DAC mode of operation. The 2 parallel or the 4 parallel DAC mode of operation may indicate that 2 parallel DACs or 4 parallel DACs, respectively, are coupled to the DAC interface 280. In one embodiment, the configuration unit 370 or the configuration unit 570 may be programmed with an ADC or DAC resolution parameter, respectively, depending on the resolution of the ADC or DAC being used. The programmed ADC or DAC type parameter, which may indicate the mode of operation, and the programmed ADC or DAC resolution may determine the number of I/O pins required for ADC or DAC communication. It is noted that the ADC interface 270 and the DAC interface 280 may be coupled to any number of ADC(s) and DAC(s), respectively. Therefore, the ADC interface 270 and the DAC interface 280 may be programmed with various modes of operation.

External Shift in Progress Unit

Figure 7:
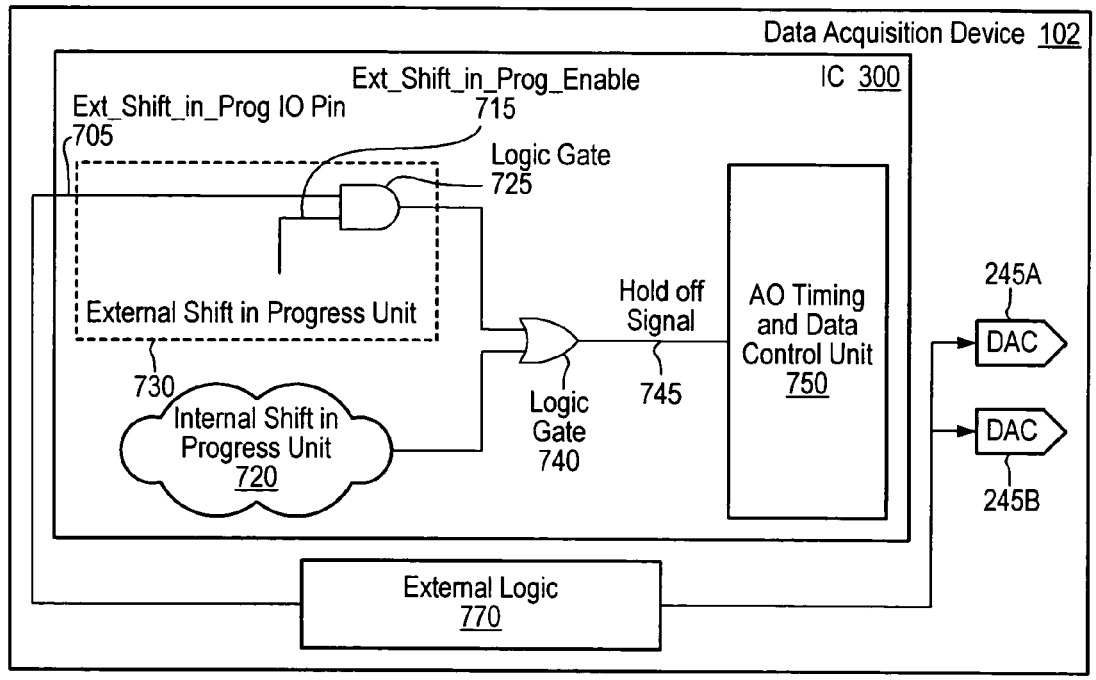
FIG. 7 is a diagram of one embodiment of an external shift in progress unit.

FIG. 7 is a diagram of one embodiment of an external shift in progress unit 730, which may be comprised in the IC 300 (e.g., the ASIC 250 of FIG. 2). In one embodiment, the external shift in progress unit 730 may be comprised in the programmable DAC interface 280 (e.g., as shown in FIG. 5) of the IC 300. The IC 300 may be comprised in, for example, a measurement device (e.g., the data acquisition device 102). The external shift in progress unit 730 may comprise a mechanism for holding off new writes to the corresponding DACs (e.g., DACs 245A and 245B) when a previous DAC write is still in progress.

The IC 300 may comprise an ext_shift_in_prog I/O pin 705, the internal shift in progress unit 720, a logic gate 725 (e.g., an AND gate), the external shift in progress unit 730, a logic gate (e.g., an OR gate) 740, and a AO timing and data control unit 750. The IC 300 may be coupled to external logic 770, which may also be coupled to the DACs 245A and 245B. It should be noted that the components described with reference to FIG. 7 are meant to be exemplary only, and are not intended to limit the invention to any specific set of components or configurations. For example, in various embodiments, one or more of the components described may be omitted, combined, modified, or additional components included, as desired.

In one embodiment, the AO timing and data control unit 750 (e.g., comprised in the timing and control unit 252 of FIG. 2) may send a write signal to either the parallel DAC interface unit 510 or the serial DAC interface unit 520 (e.g., depending on the programmed DAC type parameter) indicating that data should be sent to at least one of the DACs 245A and 245B, i.e., to perform a write operation. For example, in a serial mode of operation, the DAC write may be performed by serially shifting the data out to the corresponding serial DACs. When the write operation is started, the internal shift in progress unit 720 may assert an int_shift_in_prog signal to indicate that the write operation is in progress. The int_shift_in_prog signal may be sent to the logic gate 740 to assert a hold off signal 745. The asserted hold off signal 745 may be sent to the AO timing and data control unit 750 to hold off any new writes while the previous write is still in progress. The new write may not be performed until the hold off signal 745 is disabled, which may be achieved by the internal shift in progress unit 720 disabling the int_shift_in_prog signal.

In one embodiment, the data acquisition device 102 may include the external logic 770 (logic external to the IC 300) for handling received digital data external to the IC 300. In this embodiment, the IC 300 may be programmed to operate in a bypass mode. In the bypass mode of operation, the data may be handled by the external logic 770, including the shifting of the data to the corresponding DAC(s). However, in the bypass mode of operation, at least some of the timing and data control functions may still be performed by the IC 300. In one embodiment, the AO timing and data control unit 750 may still control the timing of when a write is performed to the DAC(s) by, e.g., the external logic 770. In this embodiment, the AO timing and data control unit 750 may send a write signal to the external logic 770 to start a DAC write. The IC 300 may also include the external shift in progress unit 730 to hold off subsequent DAC writes while the present DAC write is still in progress.

The external shift in progress unit 730 may be coupled via the ext_shift_in_prog I/O pin 705 to the external logic 770 (e.g., an FPGA), which may be programmed to perform the DAC writes. It is noted however that a plurality of I/O pins of the IC 300 may be coupled to the external logic 770. When a DAC write operation is started, the external logic 770 may send an ext_shift_in_prog signal to the external shift in progress unit 730 to indicate that the DAC write operation is in progress. When the IC 300 is programmed to operate in a bypass mode, an ext_shift_in_prog_enable signal 715 may be asserted to enable the external shift in progress unit 730. For example, the asserted ext_shift_in_prog_enable signal 715 may turn on the logic gate 725. When the external shift in progress unit 730 is enabled and an asserted ext_shift_in_prog signal is received, the external shift in progress unit 730 may send the ext_shift_in_prog signal to the logic gate 740 to assert a hold off signal 745, to hold off subsequent DAC writes while the present write is still in progress. Subsequent writes to the DACs may be held off until the ext_shift_in_prog signal is unasserted by the external logic 770.

External AO FIFO Buffer

Figure 8:
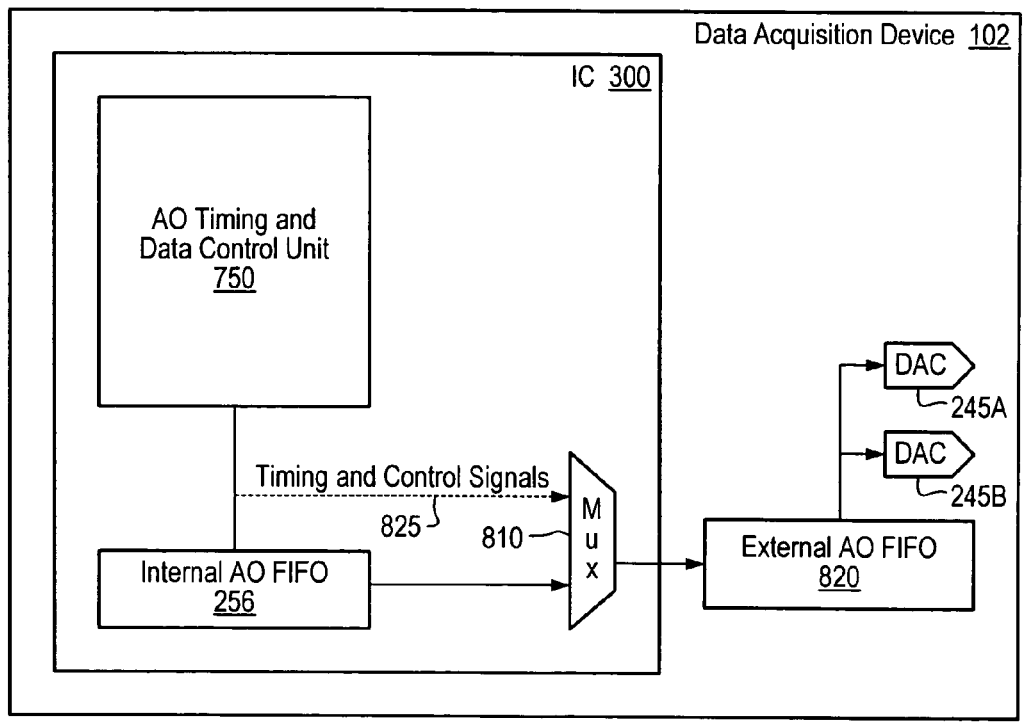
FIG. 8 is a block diagram of one embodiment of a data acquisition device including an analog output buffer external to an integrated circuit.

FIG. 8 is a block diagram of one embodiment of the data acquisition device 102 of FIG. 2 including an AO buffer external (e.g., external AO FIFO buffer 820) to the IC 300 (e.g., the ASIC 250 of FIG. 2). The IC 300 may be configured to operate in an internal FIFO mode or in an external FIFO mode of operation. The external FIFO mode may allow the IC 300 to implement features that may require a larger AO FIFO (e.g., the external AO FIFO buffer 820) than the internal AO FIFO 256. Therefore, the external FIFO mode of operation may add to the flexibility of, e.g., the data acquisition device 102.

The IC 300 may comprise AO timing and data control unit 750, the internal AO FIFO buffer 256, and a multiplexer (MUX) 810. The IC 300 may be coupled to an external AO FIFO buffer 820, which also may be coupled to the DACs 245A and 245B. It should be noted that the components described with reference to FIG. 8 are meant to be exemplary only, and are not intended to limit the invention to any specific set of components or configurations. For example, in various embodiments, one or more of the components described may be omitted, combined, modified, or additional components included, as desired.

In the internal FIFO mode of operation, the internal AO FIFO buffer 256 may be used to supply data for the DACs 245A and 245B. In this mode, signals internal to the IC 300 may manage the timing associated with the reading from the FIFO and writing to the DACs 245A and 245B, as well as providing an update to the DACs.

In one embodiment, in the external FIFO mode of operation, the data may be handled external to the IC 300, for example, by the external AO FIFO 820. Also, in the external FIFO mode of operation, the IC 300 may be configured to output the timing and control signals 825 to the external AO FIFO 820. Therefore, even in the external FIFO mode of operation, the IC 300 may manage the timing and control functions associated with the external FIFO buffer 820 and the DACs 245A and 245B, e.g., writing to the DACs, providing update signals, etc. In one embodiment, in the external FIFO mode of operation, the timing and control signals 825 may be selected by MUX 810 and may be output via the DAC data lines. In one embodiment, the timing and control signals 825 output by the IC 300 may also be used to control additional external logic, for example, external logic 770 (e.g., an FPGA) that may be used to route data to the external FIFO buffer 820 during the bypass mode of operation described above with reference to FIG. 7.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An integrated circuit for use in a measurement device, the integrated circuit comprising:
   a programmable analog-to-digital converter (ADC) interface operable to be programmed with a plurality of parameters, wherein the plurality of parameters include an ADC type parameter and an ADC data type parameter;
   wherein the programmable ADC interface is operable to function as a programmable parallel ADC interface or a programmable serial ADC interface depending upon the programmed ADC type parameter;
   wherein the programmed ADC data type parameter indicates whether the programmable ADC interface will receive ADC data in straight binary or two's complement form.

2. The integrated circuit of claim 1, wherein the programmable ADC interface is operable to function as a programmable parallel ADC interface when the programmed ADC type parameter indicates a parallel mode of operation, and the programmable ADC interface is operable to function as a programmable serial ADC interface when the programmed ADC type parameter indicates a serial mode of operation.

3. The integrated circuit of claim 1, wherein the programmable ADC interface further comprises one or more input/output (I/O) pins, wherein the one or more I/O pins are operable to receive ADC data.

4. The integrated circuit of claim 3, wherein the programmable ADC interface is further operable to be programmed with an ADC resolution parameter, wherein functions associated with a portion of the I/O pins vary depending upon the programmed ADC resolution parameter and the programmed ADC type parameter.

5. The integrated circuit of claim 4, wherein if, based on the programmed ADC resolution parameter and the programmed ADC type parameter, a portion of the I/O pins are required for communication and the portion is less than a maximum value, the portion of the I/O pins are configured as ADC data input pins and a remaining portion of the I/O pins are configured to perform other functions.

6. The integrated circuit of claim 1, wherein the programmable ADC interface is operable to perform a data conversion operation on received ADC data depending upon the programmed ADC data type parameter and a received data type signal.

7. An integrated circuit for use in a measurement device, the integrated circuit comprising:
   a programmable digital-to-analog converter (DAC) interface operable to be programmed with a plurality of parameters, wherein one of the plurality of parameters is a DAC type parameter;

wherein the programmable DAC interface is operable to function as a programmable parallel DAC interface or a programmable serial DAC interface depending upon the programmed DAC type parameter;

wherein the programmable DAC interface is operable to function as a programmable parallel DAC interface when the programmed DAC type parameter indicates a parallel mode of operation, and the programmable DAC interface is operable to function as a programmable serial DAC interface when the programmed DAC type parameter indicates a serial mode of operation; and an analog output buffer coupled to the programmable DAC interface, wherein the analog output buffer is operable to store DAC data to be transmitted via one or more I/O pins, wherein the programmable DAC interface is further operable to be programmed with a DAC resolution parameter, wherein the configuration of the analog output buffer is dependent upon the programmed DAC resolution parameter.

8. An integrated circuit for use in a measurement device, the integrated circuit comprising:

a programmable digital-to-analog converter (DAC) interface operable to be programmed with a plurality of parameters, wherein one of the plurality of parameters is a DAC type parameter;

wherein the programmable DAC interface is operable to function as a programmable parallel DAC interface or a programmable serial DAC interface depending upon the programmed DAC type parameter;

wherein the programmable DAC interface is operable to function as a programmable parallel DAC interface when the programmed DAC type parameter indicates a parallel mode of operation, and the programmable DAC interface is operable to function as a programmable serial DAC interface when the programmed DAC type parameter indicates a serial mode of operation;

wherein the programmable DAC interface further comprises one or more input/output (I/O) pins, wherein the one or more I/O pins are operable to transmit DAC data;

wherein the programmable DAC interface is further operable to be programmed with a DAC resolution parameter, wherein functions associated with a portion of the I/O pins vary depending upon the programmed DAC resolution parameter and the programmed DAC type parameter;

wherein if, based on the programmed DAC resolution parameter and the programmed DAC type parameter, a portion of the I/O pins are required for communication and the portion is less than a maximum value, the portion of the I/O pins are configured as DAC data output pins and a remaining portion of the I/O pins are configured to perform other functions.

9. An integrated circuit for use in a measurement device, the integrated circuit comprising:

a programmable digital-to-analog converter (DAC) interface operable to be programmed with a plurality of parameters, wherein one of the plurality of parameters is a DAC type parameter;

wherein the programmable DAC interface is operable to function as a programmable parallel DAC interface or a programmable serial DAC interface depending upon the programmed DAC type parameter;

wherein the programmable DAC interface is operable to function as a programmable parallel DAC interface when the programmed DAC type parameter indicates a parallel mode of operation, and the programmable DAC interface is operable to function as a programmable serial DAC interface when the programmed DAC type parameter indicates a serial mode of operation;

wherein the programmable DAC interface is further operable to be programmed with a DAC data type parameter, wherein the programmed DAC data type parameter indicates whether the programmable DAC interface is configured to transmit DAC data in straight binary or two's complement form via one or more I/O pins.

10. The integrated circuit of claim 9, wherein the programmable DAC interface is operable to perform a data conversion operation on the DAC data to be transmitted via the one or more I/O pins depending upon the programmed DAC data type parameter.

11. An integrated circuit for use in a measurement device, the integrated circuit comprising:

A programmable analog-to-digital converter (ADC) interface operable to be programmed with a plurality of parameters, wherein one of the plurality of parameters is an ADC type parameter; and a programmable digital-to-analog converter (DAC) interface operable to be programmed with a plurality of parameters, wherein one of the plurality of parameters is a DAC type parameter;

wherein the programmable ADC interface is operable to function as a programmable parallel ADC interface or a programmable serial ADC interface depending upon the programmed ADC type parameter;

wherein the programmable DAC interface is operable to function as a programmable parallel DAC interface or a programmable serial DAC interface depending upon the programmed DAC type parameter.

12. A data acquisition device, comprising:

a programmable analog-to-digital converter (ADC) interface comprising one or more input/output (I/O) pins, wherein the one or more I/O pins are operable to receive ADC data;

wherein the programmable ADC interface is operable to be programmed with an ADC resolution parameter and an ADC type parameter;

wherein functions associated with a portion of the I/O pins vary depending upon the programmed ADC resolution parameter and the programmed ADC type parameter; and an analog input buffer coupled to the programmable ADC interface, wherein the analog input buffer is operable to store ADC data, wherein a configuration of the analog input buffer is dependent upon the programmed ADC resolution parameter.

13. The data acquisition device of claim 12, wherein if, based on the programmed ADC resolution parameter and the programmed ADC type parameter, a portion of the I/O pins are required for communication and the portion is less than a maximum value, the portion of the I/O pins are configured as ADC data input pins and a remaining portion of the I/O pins are configured to perform other functions.

14. The data acquisition device of claim 12, wherein the programmable ADC interface is operable to be programmed with an ADC type parameter, wherein the programmable ADC interface is operable to function as a programmable parallel ADC interface or a programmable serial ADC interface depending upon a programmed ADC type parameter.

15. The data acquisition device of claim 12, wherein a depth and a width of the analog input buffer is dependent upon the programmed ADC resolution parameter.

16. A data acquisition device comprising:
a programmable digital-to-analog converter (DAC) interface comprising one or more I/O pins, wherein the one or more I/O pins are operable to transmit DAC data;
wherein the programmable DAC interface is operable to be programmed with a DAC resolution parameter and a DAC type parameter;
wherein functions associated with a portion of the I/O pins vary depending upon the programmed DAC resolution parameter and the programmed DAC type parameter; and
an analog output buffer coupled to the programmable DAC interface, wherein the analog output buffer is operable to store DAC data, wherein a configuration of the analog output buffer is dependent upon the programmed DAC resolution parameter.

17. The data acquisition device of claim 16, wherein if, based on the programmed DAC resolution parameter and the programmed DAC type parameter, a portion of the I/O pins are required for communication and the portion is less than a maximum value, the portion of the I/O pins are configured as DAC data output pins and a remaining portion of the I/O pins are configured to perform other functions.

18. The data acquisition device of claim 16, wherein the programmable DAC interface is operable to be programmed with a DAC type parameter, wherein the programmable DAC interface is operable to function as a programmable parallel DAC interface or a programmable serial DAC interface depending upon a programmed DAC type parameter.

19. The data acquisition device of claim 16, wherein a depth and a width of the analog output buffer is dependent upon the programmed DAC resolution parameter.

20. A data acquisition device, comprising:
a programmable analog-to-digital converter (ADC) interface operable to be programmed with an ADC data type parameter and operable to receive a data type signal, wherein a programmed ADC data type parameter indicates whether the programmable ADC interface will receive ADC data in straight binary or two's complement form, wherein the data type signal indicates whether the data acquisition device received a unipolar analog signal or a bipolar analog signal;
wherein the programmable ADC interface is operable to perform a data conversion operation on the received ADC data depending upon the programmed ADC data type parameter and the received data type signal.

21. The data acquisition device of claim 20, wherein the programmable ADC interface comprises a data conversion and extension unit operable to perform a data conversion operation on the received ADC data depending upon the programmed ADC data type parameter and the received data type signal, and the data conversion and extension unit is also operable to perform an extension operation on the received ADC data depending upon a programmed ADC resolution parameter.

22. The data acquisition device of claim 21, wherein the data conversion and extension unit comprises a first logic circuit operable to select a most significant bit (MSB) of the received ADC data depending upon the programmed ADC resolution parameter to perform a data conversion operation on the received ADC data depending upon the programmed ADC data type parameter and the received data type signal.

23. The data acquisition device of claim 22, wherein the first logic circuit of the data conversion and extension unit is operable to invert the selected MSB of the received ADC data if:
the received data type signal indicates that the data acquisition device received a unipolar analog signal and the programmed ADC data type parameter indicates that the programmable ADC interface will receive ADC data in two's complement form, to convert the received ADC data from two's complement to straight binary form, or
the received data type signal indicates that the data acquisition device received a bipolar analog signal and the programmed ADC data type parameter indicates that the programmable ADC interface will receive ADC data in straight binary form, to convert the received ADC data from straight binary to two's complement form.

24. The data acquisition device of claim 22, wherein the first logic circuit of the data conversion and extension unit is operable to maintain the selected MSB of the received ADC data if:
the received data type signal indicates that the data acquisition device received a unipolar analog signal and the programmed ADC data type parameter indicates that the programmable ADC interface will receive ADC data in straight binary form, to maintain the format of the received ADC data, or
the received data type signal indicates that the data acquisition device received a bipolar analog signal and the programmed ADC data type parameter indicates that the programmable ADC interface will receive ADC data in two's complement form, to maintain the format of the received ADC data.

25. The data acquisition device of claim 22, wherein the data conversion and extension unit comprises a second logic circuit operable to perform an extension operation on the received ADC data depending upon whether the programmed ADC resolution parameter is equal to one or more predetermined values.

26. The data acquisition device of claim 25, wherein if the programmed ADC resolution parameter is not equal to the one or more predetermined values, the second logic circuit is operable to perform an extension operation by adding extra bits to the received ADC data.

27. The data acquisition device of claim 26, wherein the second logic circuit is operable to add a particular number of extra bits so that the number of bits associated with the ADC data equals one of the predetermined values.

28. The data acquisition device of claim 26, wherein the data conversion and extension unit is operable to receive the data type signal, wherein if the received data type signal indicates that the data acquisition device received a bipolar analog signal, each of the added extra bits comprises a logic value associated with an inverted or uninverted MSB of the received ADC data to sign extend the received ADC data.

29. The data acquisition device of claim 28, wherein if the received data type signal indicates that the data acquisition device received a unipolar analog signal, each of the added extra bits comprises a logic low value to non-sign extend the received ADC data.

30. The data acquisition device of claim 20, further comprising:
a programmable DAC interface operable to be programmed with a DAC data type parameter, wherein a programmed DAC data type parameter indicates whether one or more digital-to-analog converters (DACs) coupled to the programmable DAC interface are configured to receive DAC data in straight binary or two's complement form;

wherein the programmable DAC interface is operable to perform a data conversion operation on the DAC data to be transmitted depending upon a programmed DAC data type parameter.

31. The data acquisition device of claim 30, wherein the programmable DAC interface comprises a data conversion unit, wherein the data conversion unit comprises a logic circuit operable to select a most significant bit (MSB) of the DAC data to be transmitted depending upon a programmed DAC resolution parameter, to perform a data conversion operation on the DAC data to be transmitted depending upon the programmed DAC data type parameter.

32. The data acquisition device of claim 31, wherein the logic circuit of the data conversion unit is operable to invert the selected MSB if:

the DAC data to be transmitted is in straight binary form and the programmed DAC data type parameter indicates that corresponding one or more DACs coupled to the programmable DAC interface are configured to receive the DAC data in two's complement form, or the DAC data to be transmitted is in two's complement form and the programmed DAC data type parameter indicates that the corresponding one or more DACs coupled to the programmable DAC interface are configured to receive the DAC data in straight binary form.

33. A data acquisition device, comprising:

one or more analog-to-digital converters (ADCs) operable to convert received analog data into digital ADC data;

one or more digital-to-analog converters (DACs) operable to convert received digital DAC data into analog data;

an integrated circuit coupled to the one or more ADCs and the one or more DACs, the integrated circuit comprising:

a programmable ADC interface operable to receive the digital ADC data from the one or more ADCs, wherein the programmable ADC interface is also operable to be programmed with a plurality of parameters, wherein one of the plurality of parameters is an ADC type parameter, wherein the programmable ADC interface is operable to function as a programmable parallel ADC interface or a programmable serial ADC interface depending upon a programmed ADC type parameter, and a programmable DAC interface operable to transmit the digital DAC data to the one or more DACs, wherein the programmable DAC interface is also operable to be programmed with a plurality of parameters, wherein one of the plurality of parameters is a DAC type parameter, wherein the programmable DAC interface is operable to function as a programmable parallel DAC interface or a programmable serial DAC interface depending upon a programmed DAC type parameter.

34. The data acquisition device of claim 33, wherein:

the programmable ADC interface is operable to function as a programmable parallel ADC interface when the programmed ADC type parameter indicates a parallel mode of operation, and the programmable ADC interface is operable to function as a programmable serial ADC interface when the programmed ADC type parameter indicates a serial mode of operation; and the programmable DAC interface is operable to function as a programmable parallel DAC interface when the programmed DAC type parameter indicates a parallel mode of operation, and the programmable DAC interface is operable to function as a programmable serial DAC interface when the programmed DAC type parameter indicates a serial mode of operation.

35. The data acquisition device of claim 33, wherein:

the programmable ADC interface is operable to be programmed with an ADC resolution parameter and an ADC data type parameter; and the programmable DAC interface is operable to be programmed with a DAC resolution parameter and a DAC data type parameter.

36. The data acquisition device of claim 35, wherein the programmable ADC interface comprises one or more input/output (I/O) pins, wherein the one or more I/O pins are operable to receive the ADC data, wherein functions associated with a portion of the I/O pins vary depending upon a programmed ADC resolution parameter and the programmed ADC type parameter, and wherein if, based on the programmed ADC resolution parameter and the programmed ADC type parameter, a portion of the I/O pins are required for communication and the portion is less than a maximum value, the portion of the I/O pins are configured as ADC data input pins and a remaining portion of the I/O pins are configured to perform other functions.

37. The data acquisition device of claim 35, wherein the programmable DAC interface comprises one or more input/output (I/O) pins, wherein the one or more I/O pins are operable to transmit the DAC data, wherein functions associated with a portion of the I/O pins vary depending upon a programmed DAC resolution parameter and the programmed DAC type parameter, and wherein if, based on the programmed DAC resolution parameter and the programmed DAC type parameter, a portion of the I/O pins are required for communication and the portion is less than a maximum value, the portion of the I/O pins are configured as DAC data output pins and a remaining portion of the I/O pins are configured to perform other functions.

38. The data acquisition device of claim 35, wherein the integrated circuit further comprises:

an analog input buffer coupled to the programmable ADC interface, wherein the analog input buffer is operable to store the ADC data, wherein a depth and a width of the analog input buffer is dependent upon the programmed ADC resolution parameter; and an analog output buffer coupled to the programmable DAC interface, wherein the analog output buffer is operable to store the DAC data, wherein a depth and a width of the analog output buffer is dependent upon the programmed DAC resolution parameter.

39. The data acquisition device of claim 35, wherein the programmable ADC interface is operable to receive a data type signal, wherein the data type signal indicates whether the data acquisition device received a unipolar analog signal or a bipolar analog signal, wherein a programmed ADC data type parameter indicates whether the programmable ADC interface will receive ADC data from the one or more ADCs in straight binary or two's complement form, wherein the programmable ADC interface is operable to perform a data conversion operation on the received ADC data depending upon the programmed ADC data type parameter and the received data type signal.

40. The data acquisition device of claim 39, wherein the programmable ADC interface comprises a data conversion and extension unit operable to perform a data conversion operation on the received ADC data depending upon the programmed ADC data type parameter and the received data type signal, and the data conversion and extension unit is also operable to perform an extension operation on the received ADC data depending upon a programmed ADC resolution parameter.

41. The data acquisition device of claim 35, wherein a programmed DAC data type parameter indicates whether the one or more DACs are configured to receive DAC data in straight binary or two's complement form, wherein the programmable DAC interface is operable to perform a data conversion operation on the DAC data to be transmitted to the one or more DACs depending upon the programmed DAC data type parameter.

42. The data acquisition device of claim 33, wherein the integrated circuit is configured to operate in a bypass mode of operation when logic external to the integrated circuit is operable to perform write operations to the one or more DACs, wherein during the bypass mode of operation the integrated circuit is operable to transmit timing and control signals to the external logic to perform the write operations.

43. The data acquisition device of claim 42, wherein the integrated circuit further comprises an external shift in progress unit, wherein the external shift in progress unit is enabled when the integrated circuit is configured to operate in the bypass mode of operation, wherein during the bypass mode of operation the external shift in progress unit of the integrated circuit is operable to assert a hold off signal when a write operation to the one or more DACs is in progress to hold off new write operations.

44. The data acquisition device of claim 33, further comprising an analog output buffer located external to the integrated circuit, wherein during an external buffer mode of operation, the integrated circuit is operable to transmit timing and control signals to the external analog output buffer to perform update and write operations to the one or more DACs.

45. The data acquisition device of claim 33, comprised in a data acquisition system comprising a computer system for processing data obtained from one or more data acquisition processes.

46. The data acquisition device of claim 45, comprised in a data acquisition system further comprising a unit under test (UUT), wherein the UUT comprises a sensor operable to provide the data acquisition device with sensor data.

47. A method for configuring a data acquisition device, the method comprising:
   programming a programmable analog-to-digital converter (ADC) interface with an ADC type parameter, the programmable ADC interface functioning as a programmable parallel ADC interface or as a programmable serial ADC interface depending upon the programmed ADC type parameter;
   the programmable ADC interface functioning as a programmable parallel ADC interface if the programmed ADC type parameter indicates a parallel mode of operation;
   the programmable ADC interface functioning as a programmable serial ADC interface if the programmed ADC type parameter indicates a serial mode of operation; and
   programming the programmable ADC interface with an ADC data type parameter, wherein the programmed ADC data type parameter indicates whether the programmable ADC interface will receive ADC data in straight binary or two's complement form.

48. The method of claim 47, further comprising programming the programmable ADC interface with an ADC resolution parameter.

49. The method of claim 48, wherein the programmable ADC interface comprises one or more input/output (I/O) pins, and wherein if, based on a programmed ADC resolution parameter and the programmed ADC type parameter, a portion of the I/O pins are required for communication and the portion is less than a maximum value, the method further comprises configuring the portion of the I/O pins as ADC data input pins and configuring a remaining portion of the I/O pins to perform other functions.

50. The method of claim 48, wherein an analog input buffer is coupled to the programmable ADC interface, the method further comprises changing a depth and a width of the analog input buffer based on a programmed ADC resolution parameter.

51. The method of claim 47, further comprising:
   the programmable ADC interface receiving a data type signal, wherein the data type signal indicates whether the data acquisition device received a unipolar analog signal or a bipolar analog signal; and
   the programmable ADC interface performing a data conversion operation on the received ADC data depending upon the programmed ADC data type parameter and the received data type signal.

52. A method for configuring a data acquisition device, the data acquisition device comprising a programmable digital-to-analog converter (DAC) interface and an analog output buffer, the method comprising:
   programming the programmable DAC interface with a DAC type parameter, the programmable DAC interface functioning as a programmable parallel DAC interface or a programmable serial DAC interface depending upon a programmed DAC type parameter;
   the programmable DAC interface functioning as a programmable parallel DAC interface if the programmed DAC type parameter indicates a parallel mode of operation; and
   the programmable DAC interface functioning as a programmable serial DAC interface if the programmed DAC type parameter indicates a serial mode of operation;
   programming the programmable DAC interface with a DAC resolution parameter;
   changing a depth and a width of the analog output buffer coupled to the programmable DAC interface based on the programmed DAC resolution parameter.

53. A method for configuring a data acquisition device, the data acquisition device comprising a programmable digital-to-analog converter (DAC) interface including one or more input/output (I/O) pins, the method comprising:
   programming the programmable DAC interface with a DAC type parameter, the programmable DAC interface functioning as a programmable parallel DAC interface or a programmable serial DAC interface depending upon a programmed DAC type parameter;
   the programmable DAC interface functioning as a programmable parallel DAC interface if the programmed DAC type parameter indicates a parallel mode of operation; and
   the programmable DAC interface functioning as a programmable serial DAC interface if the programmed DAC type parameter indicates a serial mode of operation;
   programming the programmable DAC interface with a DAC resolution parameter;
   wherein if, based on a programmed DAC resolution parameter and the programmed DAC type parameter, a portion of the I/O pins are required for communication and the portion is less than a maximum value, configuring the portion of the I/O pins as DAC data output pins and configuring a remaining portion of the I/O pins to perform other functions.

54. A method for configuring a data acquisition device, the method comprising:

programming a programmable digital-to-analog converter (DAC) interface with a DAC type parameter, the programmable DAC interface functioning as a programmable parallel DAC interface or a programmable serial DAC interface depending upon a programmed DAC type parameter;

the programmable DAC interface functioning as a programmable parallel DAC interface if the programmed DAC type parameter indicates a parallel mode of operation; and the programmable DAC interface functioning as a programmable serial DAC interface if the programmed DAC type parameter indicates a serial mode of operation;

programming the programmable DAC interface with a DAC data type parameter, wherein a programmed DAC data type parameter indicates whether one or more DACs coupled to the programmable DAC interface are configured to receive DAC data in straight binary or two's complement form;

the programmable DAC interface performing a data conversion operation on the DAC data to be transmitted depending upon the programmed DAC data type parameter.

55. An integrated circuit for use in a measurement device, the integrated circuit comprising:

a programmable analog-to-digital converter (ADC) interface operable to be programmed with a plurality of parameters, wherein the plurality of parameters include an ADC type parameter and an ADC resolution parameter;

wherein the programmable ADC interface is operable to function as a programmable parallel ADC interface or a programmable serial ADC interface depending upon the programmed ADC type parameter; and an analog input buffer coupled to the programmable ADC interface, wherein the analog input buffer is operable to store ADC data received via one or more I/O pins, wherein a configuration of the analog input buffer is dependent upon the programmed ADC resolution parameter.

* * * * *